(12) United States Patent
Rowe et al.

(10) Patent No.: US 11,602,839 B2
(45) Date of Patent: *Mar. 14, 2023

(54) ARTIFICIAL MUSCLES HAVING VACUUM COUPLED ELECTRODE INSULATORS AND METHODS OF MANUFACTURING THE SAME

(71) Applicant: Toyota Motor Engineering & Manufacturing North America, Inc., Plano, TX (US)

(72) Inventors: Michael P. Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,070

(22) Filed: Jan. 11, 2022

(65) Prior Publication Data

US 2023/0001572 A1    Jan. 5, 2023

Related U.S. Application Data

(63) Continuation of application No. 17/364,142, filed on Jun. 30, 2021, now Pat. No. 11,253,996.

(51) Int. Cl.
  *B25J 9/10*  (2006.01)
  *F03G 7/06*  (2006.01)
  (Continued)

(52) U.S. Cl.
  CPC ............ *B25J 9/1075* (2013.01); *F03G 7/062* (2021.08); *F03G 7/064* (2021.08); *F03G 7/0616* (2021.08);
  (Continued)

(58) Field of Classification Search
  CPC ...... B25J 9/1075; F03G 7/0616; F03G 7/062; F03G 7/064; F15B 15/08; F15B 21/06; F15B 21/065
  (Continued)

(56) References Cited

U.S. PATENT DOCUMENTS

| 10,302,586 B2 | 5/2019 | Sun et al. |
| 10,640,033 B1 | 5/2020 | Gandhi et al. |

(Continued)

FOREIGN PATENT DOCUMENTS

| CN | 1582866 A | 2/2005 |
| EP | 3282494 A1 | 2/2018 |

(Continued)

OTHER PUBLICATIONS

Nicholas Kellaris, et al., "Peano-HASEL Actuators: Muscle-Mimetic, Electrohydraulic Transducers That Linearly Contract on Activiation", Magazine, Science Robotics Article, vol. 3, Issue 14, Jan. 5, 2018, University of Colorado Boulder, Boulder, CO 80309, USA.

*Primary Examiner* — Hoang M Nguyen
(74) *Attorney, Agent, or Firm* — Dinsmore & Shohl LLP

(57) ABSTRACT

A method of manufacturing an electrode assembly includes positioning a layer stack comprising an electrode positioned between an electrode insulator and a support polymer in a vacuum bag, removing air from the vacuum bag thereby vacuum coupling the electrode to the electrode insulator, and removing the layer stack from the vacuum bag, where upon removal of the layer stack from the vacuum bag, the electrode remains vacuum coupled to the electrode insulator and the electrode insulator is in direct contact with the electrode, thereby forming an electrode assembly.

20 Claims, 14 Drawing Sheets

(51) Int. Cl.
    *F15B 21/06*     (2006.01)
    *F15B 15/08*     (2006.01)

(52) U.S. Cl.
    CPC .............. *F15B 15/08* (2013.01); *F15B 21/06* (2013.01); *F15B 21/065* (2013.01)

(58) Field of Classification Search
    USPC .................................................. 60/527–529
    See application file for complete search history.

(56) References Cited

U.S. PATENT DOCUMENTS

| | | |
|---|---|---|
| 10,995,779 B2 | 5/2021 | Keplinger et al. |
| 11,253,996 B1 * | 2/2022 | Rowe ....................... F15B 21/06 |
| 2009/0085444 A1 | 4/2009 | Rivera et al. |
| 2009/0115285 A1 | 5/2009 | Najaf et al. |
| 2021/0237809 A1 | 8/2021 | Rowe et al. |

FOREIGN PATENT DOCUMENTS

| | | |
|---|---|---|
| JP | H02242561 A | 9/1999 |
| JP | 2014112485 A | 6/2014 |
| KR | 1020170087318 A | 7/2017 |
| WO | 2019173227 A1 | 9/2019 |

\* cited by examiner

ARTIFICIAL MUSCLES HAVING VACUUM COUPLED ELECTRODE INSULATORS AND METHODS OF MANUFACTURING THE SAME

CROSS-REFERENCE TO RELATED APPLICATION

This application is a continuation of U.S. patent application Ser. No. 17/364,142, filed Jun. 30, 2021, which is hereby incorporated by reference in its entirety.

TECHNICAL FIELD

The present specification generally relates to artificial muscles, in particular, to artificial muscles having vacuum coupled electrode insulators.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluid-based actuators. For example, certain artificial muscles may introduce fluid into and out of a volume to expand or contract the artificial muscles to perform mechanical work on a load. However, these artificial muscles have some material limitations due to a reliance on heat sealing and adhesives.

Accordingly, a need exists for methods of manufacturing artificial muscles that facilitate the use of materials that are difficult to heat seal.

SUMMARY

In one embodiment, a method of manufacturing an electrode assembly includes positioning a layer stack comprising an electrode positioned between an electrode insulator and a support polymer in a vacuum bag, removing air from the vacuum bag thereby vacuum coupling the electrode to the electrode insulator, and removing the layer stack from the vacuum bag, where upon removal of the layer stack from the vacuum bag, the electrode remains vacuum coupled to the electrode insulator and the electrode insulator is in direct contact with the electrode, thereby forming an electrode assembly.

In another embodiment, a method of manufacturing an artificial muscle includes forming a first electrode assembly and a second electrode assembly. Forming each electrode assembly includes positioning a layer stack including an electrode positioned between an electrode insulator and a support polymer in a vacuum bag, removing air from the vacuum bag thereby vacuum coupling the electrode to the electrode insulator, and removing the layer stack from the vacuum bag, where upon removal of the layer stack from the vacuum bag, the electrode remains vacuum coupled to the electrode insulator and the electrode insulator is in direct contact with the electrode, thereby forming the electrode assembly. The method further includes positioning the first electrode assembly and the second electrode assembly in a stacked arrangement between a first film layer and a second film layer and sealing the first film layer to the second film layer thereby forming an artificial muscle comprising the first electrode assembly and the second electrode assembly housed within a housing formed from the first film layer and the second film layer.

In yet another embodiment, an artificial muscle includes a housing having an electrode region and an expandable fluid region. A dielectric fluid housed within the housing. An electrode pair is positioned in the electrode region of the housing, the electrode pair includes a first electrode and a second electrode. The electrode insulator is vacuum coupled to the first electrode in direct contact with the first electrode. The electrode insulator includes a high dielectric constant polymer and the electrode pair is actuatable between a non-actuated state and an actuated state such that actuation from the non-actuated state to the actuated state directs the dielectric fluid into the expandable fluid region, expanding the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
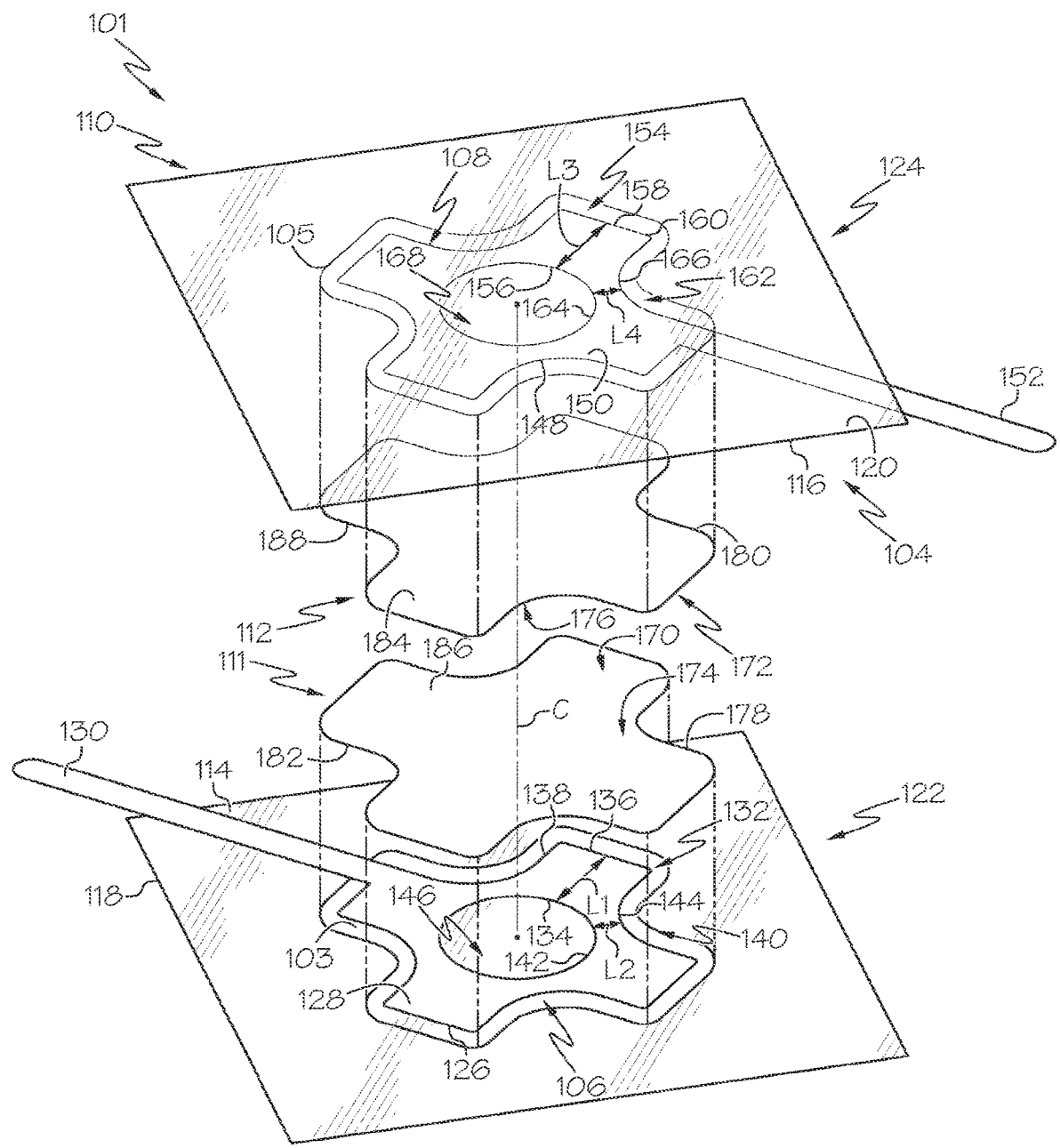
FIG. 1 schematically depicts an exploded view of an illustrative artificial muscle formed using a vacuum coupling process, according to one or more embodiments shown and described herein.

Embodiments described herein are directed to artificial muscles and methods of manufacturing artificial muscles. The methods of manufacturing artificial muscles described herein include a vacuum sealing process, which facilitates the use of certain high performance electrode insulators that are unable to effectively heat seal. Without intending to be limited by theory, in the field of dielectric elastomer actuators, increasing the dielectric constant of the electrical insulating polymer (e.g., the electrode insulators of artificial muscles described herein) increases actuator performance. However, high dielectric constant polymers, such as polyvinylidene fluoride (PVDF), do not effectively heat seal to an electrode. While an adhesive layer may be positioned between the high dielectric constant polymer and the electrode, the inclusion of an adhesive will introduce series capacitance complexity. Thus, forming artificial muscles in which the electrode insulators are vacuum coupled to the electrode facilitates the use of high dielectric constant polymers, increasing the performance of the artificial muscles. Various embodiments of artificial muscles and methods of manufacturing artificial muscles are described in more detail herein. Whenever possible, the same reference numerals will be used throughout the drawings to refer to the same or like parts.

FIGS. 1-4 depict an artificial muscle 101 that may be formed using the methods of manufacturing depicted in FIGS. 5A-9. In particular, the artificial muscle 101 shown in FIGS. 1-4 comprises a housing 110 having an electrode region 194 and an expandable fluid region 196. An electrode pair 104 comprising a first electrode 106 and a second electrode 108 is positioned in the electrode region 194 of the housing 110 and a dielectric fluid 198 is housed within the housing 110. In operation, the electrode pair 104 is actuatable between a non-actuated state and an actuated state such that actuation from the non-actuated state to the actuated state directs the dielectric fluid 198 into the expandable fluid region 196, expanding the expandable fluid region 196, which may provide an actuation force. In addition, the artificial muscle 101 includes the first electrode insulator 111 vacuum coupled to the first electrode 106 in direct contact with the first electrode 106 and a second electrode insulator 112 vacuum coupled to the second electrode 108 in direct contact with the second electrode 108. However, it should be understood that embodiments having the first electrode insulator 111 without the second electrode insulator 112 are contemplated. As described in more detail below, with respect to FIGS. 5A-9, vacuum coupling the first electrode insulator 111 to the first electrode 106 and the second electrode insulator 112 to the second electrode 108 allows for the use of high dielectric polymer materials, such as PDVF, as electrode insulators, which are not amenable to heat sealing but increase the actuation performance of the artificial muscle.

Figure 2:
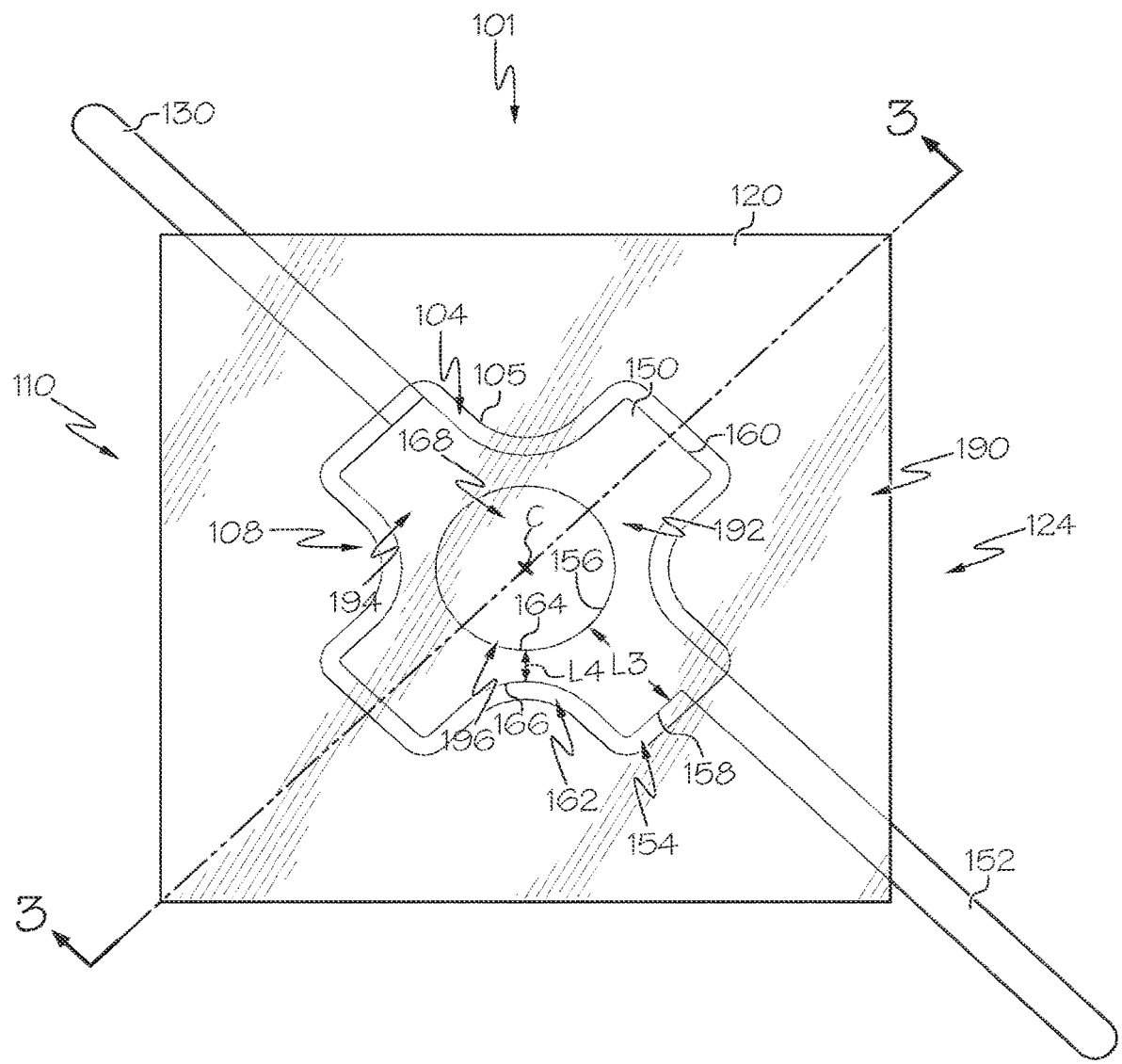
FIG. 2 schematically depicts a top view of the artificial muscle of FIG. 1, according to one or more embodiments shown and described herein.

Referring now to FIGS. 1 and 2, the artificial muscle 101 includes the housing 110, the electrode pair 104, including the first electrode 106 and the second electrode 108, coupled to opposite surfaces of the housing 110, the first electrode insulator 111 fixed to the first electrode 106, and the second electrode insulator 112 fixed to the second electrode 108. In particular, the first electrode insulator 111 is vacuum coupled to the first electrode 106 in direct contact with the first electrode 106 and the second electrode insulator 112 is vacuum coupled to the second electrode 108 in direct contact with the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120. The first inner surface 114 and the second inner surface 116 of the housing 110 are heat-sealable.

As shown in FIG. 1, the artificial muscle 101 may further comprise a first support polymer 103 positioned between the first electrode 106 and the first inner surface 114 of the housing 110 and a second support polymer 105 positioned between the second electrode 108 and the second inner surface 116 of the housing 110. As described herein, the first and second support polymers 103, 105 assist the vacuum coupling processes that allows for the use of high dielectric polymers as the first and second electrode insulators 111, 112. In some embodiments, the first support polymer 103 and the second support polymer 105 generally include the same structure and composition. For example, in some embodiments, the first support polymer 103 and the second support polymer 105 each comprise biaxially oriented polypropylene (BOPP).

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprise BOPP.

The first electrode 106 and the second electrode 108 are each positioned between the first film layer 122 and the second film layer 124. In some embodiments, the first electrode 106 and the second electrode 108 are each aluminum-coated polyester such as, for example, Mylar®, i.e., biaxially-oriented polyethylene terephthalate (BoPET). However, it should be understood that the first electrode 106 and the second electrode 108 may comprise other electrically coupled materials, such as copper, silver, titanium, platinum, or the like, which may be coated with a polyester such as Mylar®. The first electrode 106 and the second electrode 108 may comprise flexible materials or inflexible materials (e.g., rigid materials) and in some embodiments may comprise stretchable materials. Moreover, embodiments are contemplated in which the first electrode 106 and the second electrode 108 comprise a hydrogel material. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 101 is negatively charged.

Figure 15:
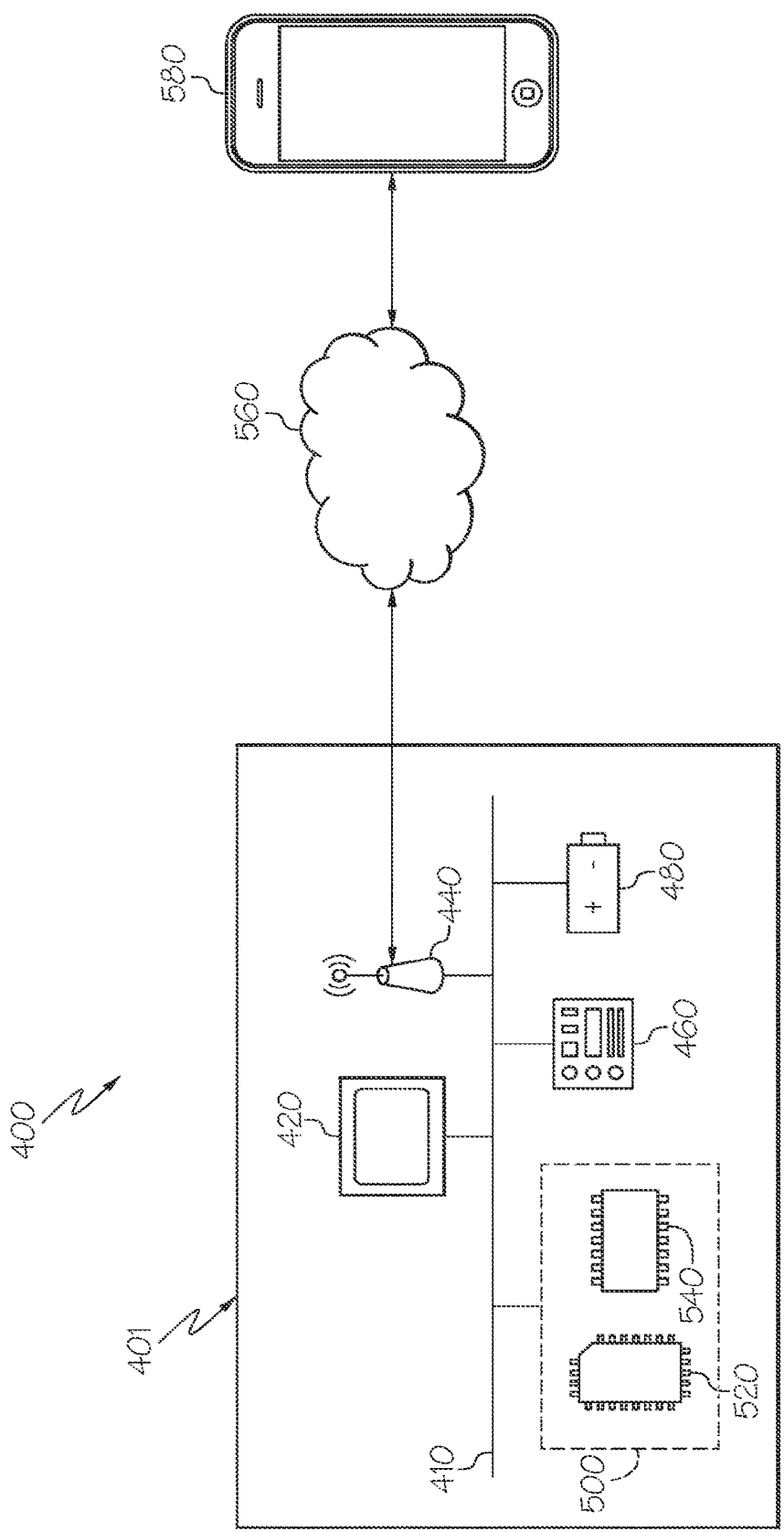
FIG. 15 schematically depicts an actuation system for operating an artificial muscle, according to one or more embodiments shown and described herein.

The first electrode 106 has a film-facing surface 126 and an opposite inner surface 128. The first electrode 106 is positioned proximate the first film layer 122, specifically, the first inner surface 114 of the first film layer 122. That is, the first electrode 106 may be in contact with the first inner surface 114 of the first film layer 122 or in contact with the first support polymer 103 which is disposed between the first electrode 106 and the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400, as shown in FIG. 15. Similarly, the second electrode 108 has a film-facing surface 148 and an opposite inner surface 150. The second electrode 108 is positioned proximate the second film layer 124, specifically, the second inner surface 116 of the second film layer 124. That is, the second electrode 108 may be in contact with the second inner surface 116 of the second film layer 124 or in contact with the second support polymer 105 which is disposed between the second electrode 108 and the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

Figure 7:
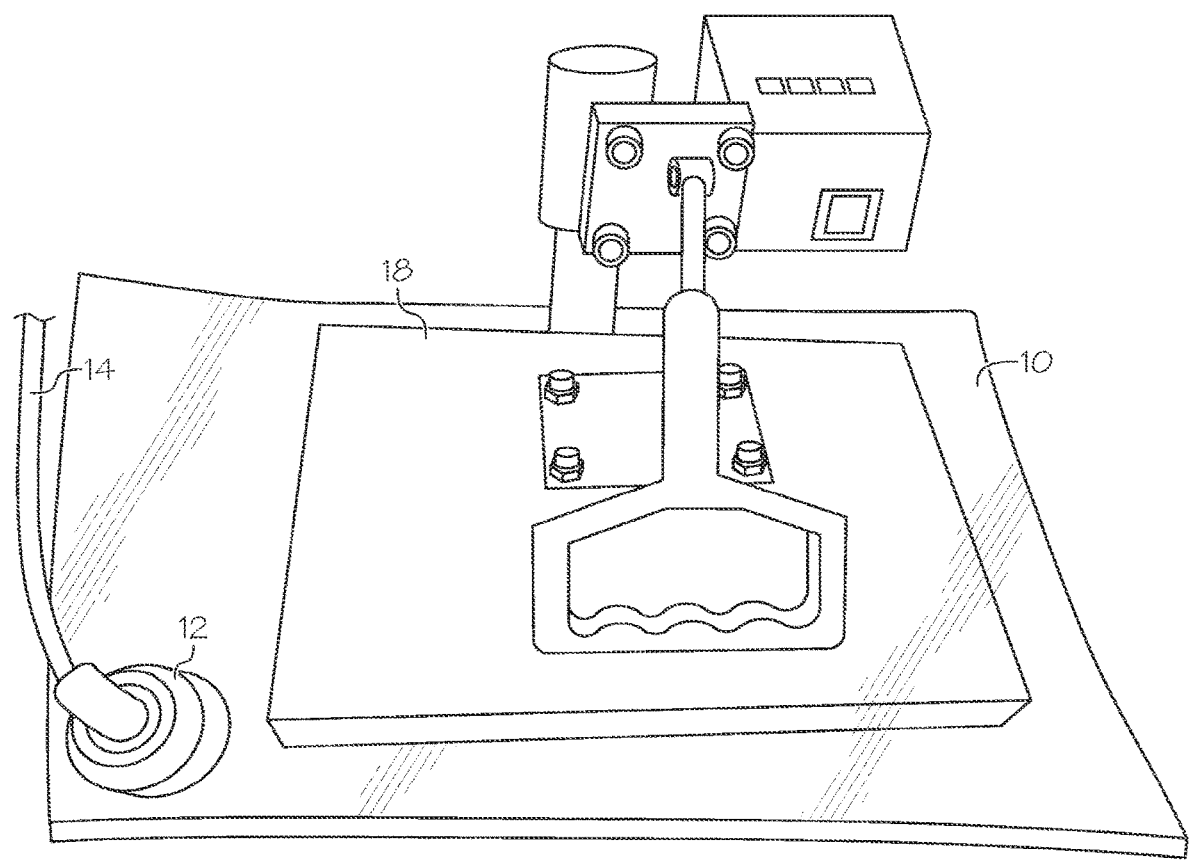
FIG. 7 schematically depicts the first layer stack of FIGS. 5A and 6 undergoing a heat sealing process, according to one or more embodiments shown and described herein.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIG. 7, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 1 and 2, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 3:
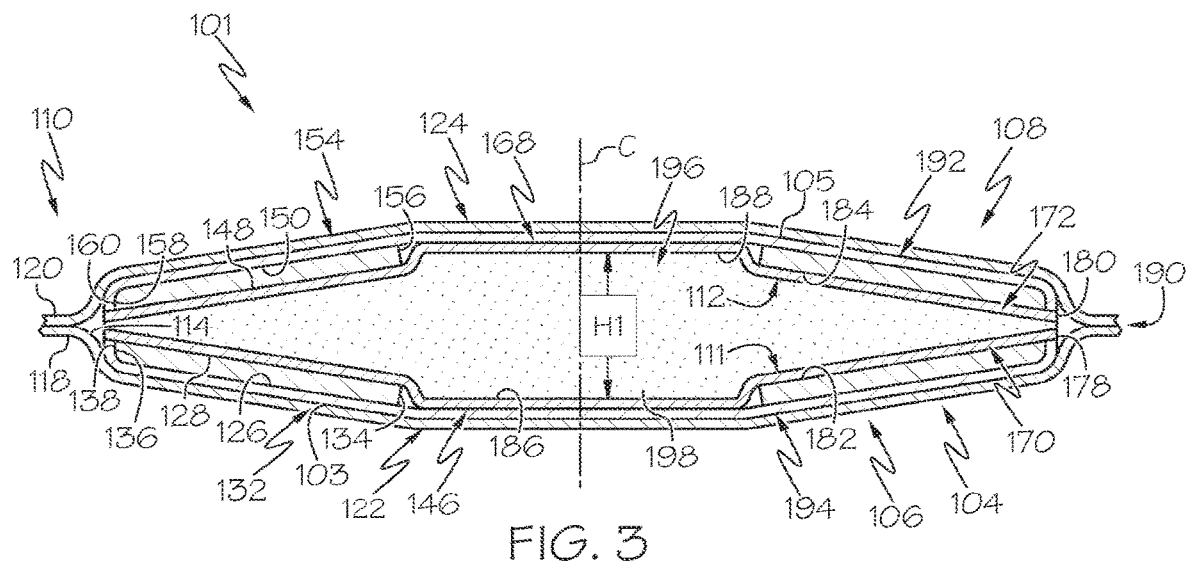
FIG. 3 schematically depicts a cross-sectional view of the artificial muscle of FIG. 1 taken along line 3-3 in FIG. 2 in a non-actuated state, according to one or more embodiments shown and described herein.
Figure 4:
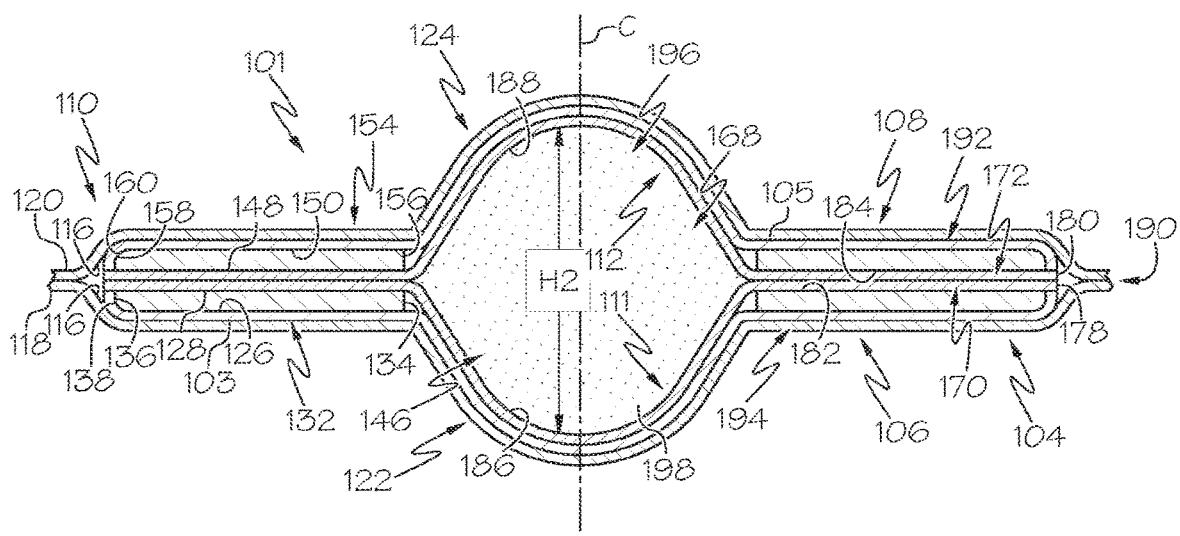
FIG. 4 schematically depicts a cross-sectional view of the artificial muscle of FIG. 1 taken along line 3-3 in FIG. 2 in an actuated state, according to one or more embodiments shown and described herein.
Figure 10:
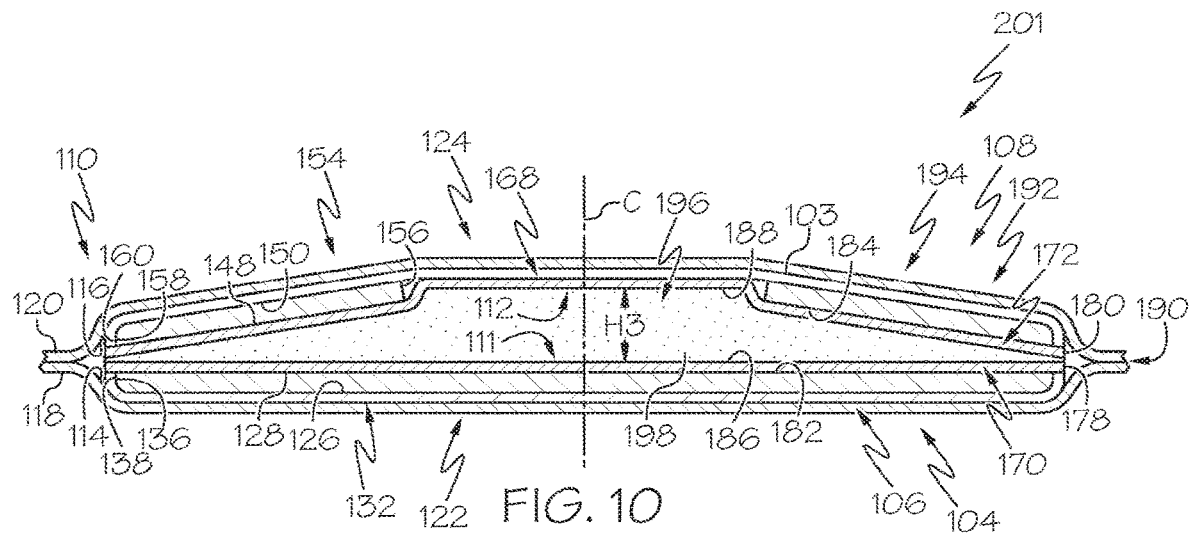
FIG. 10 schematically depicts a cross-sectional view of another illustrative artificial muscle in a non-actuated state, according to one or more embodiments shown and described herein.
Figure 11:
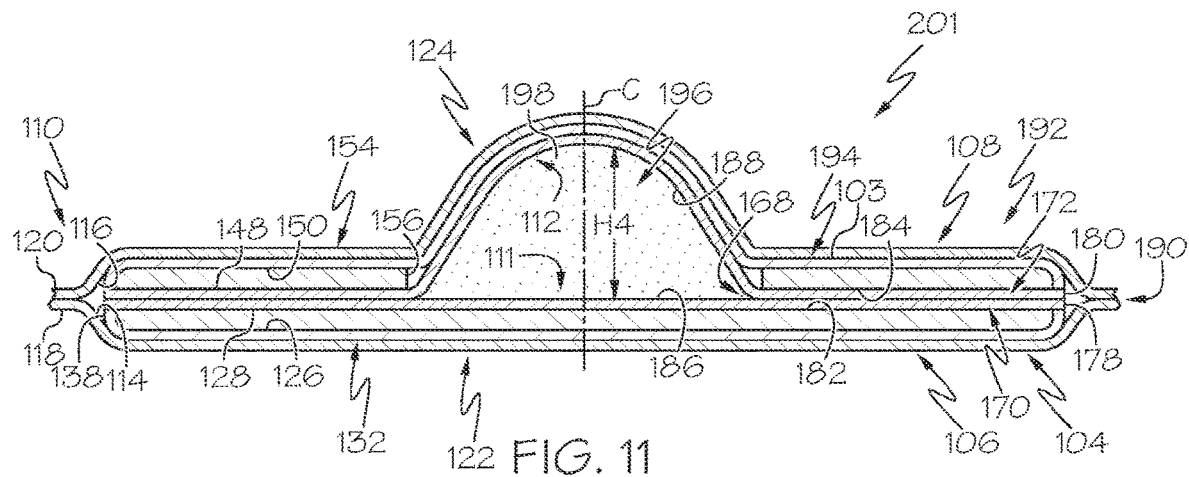
FIG. 11 schematically depicts a cross-sectional view of the artificial muscle of FIG. 11 in an actuated state, according to one or more embodiments shown and described herein.

Referring now to FIGS. 1-4, at least one of the first electrode 106 and the second electrode 108 have a central opening formed therein between the first end 134 of the tab portions 132 and the first end 142 of the bridge portions 140. In FIGS. 3 and 4, the first electrode 106 has a central opening 146. However, it should be understood that the first electrode 106 does not need to include the central opening 146 when a central opening is provided within the second electrode 108, as shown in FIGS. 10 and 11. Alternatively, the second electrode 108 does not need to include the central opening when the central opening 146 is provided within the first electrode 106. Referring still to FIGS. 1-4, the first electrode insulator 111 and the second electrode insulator 112 have a geometry generally corresponding to the first electrode 106 and the second electrode 108, respectively. Thus, the first electrode insulator 111 and the second electrode insulator 112 each have tab portions 170, 172 and bridge portions 174, 176 corresponding to like portions on the first electrode 106 and the second electrode 108. However, the first electrode insulator 111 and the second electrode insulator 112 each have an outer perimeter 178, 180 that extends laterally beyond the outer perimeter 138 of the first electrode 106 and the outer perimeter 160 of the second electrode 108, respectively, when positioned thereon. This facilitates coupling between the first electrode insulator 111 and the first support polymer 103 and between the second electrode insulator 112 and the second support polymer 105. However, it should be understood that embodiments are contemplated in which the outer perimeter 178, 180 of the first electrode insulator 111 and the second electrode insulator 112 correspond to the outer perimeter 138 of the first electrode 106 and the outer perimeter 160 of the second electrode 108, respectively, when positioned thereon.

It should be appreciated that, in some embodiments, the first electrode insulator 111 and the second electrode insulator 112 generally include the same structure and composition. As such, in some embodiments, the first electrode insulator 111 and the second electrode insulator 112 each include a first surface 182, 184 and an opposite second surface 186, 188, respectively. In some embodiments, the first electrode insulator 111 and the second electrode insulator 112 are each a polymer material that is vacuum coupled to the inner surface 128 of the first electrode 106 and the inner surface 150 of the second electrode 108, respectively. For example, as described in more detail herein, the first electrode insulator 111 and the second electrode insulator 112 may comprise a high dielectric constant polymer.

Referring now to FIGS. 2-4, the artificial muscle 101 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 2 the second electrode 108 is stacked on top of the first electrode 106 and, therefore, the first electrode 106 and the first film layer 122 are not shown. In its assembled form, the first electrode 106, the second electrode 108, the first electrode insulator 111, the second electrode insulator 112, the first support polymer 103, and the second support polymer 105 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrode insulator 111, the second electrode insulator 112, the first support polymer 103, and the second support polymer 105 provide a barrier that prevents the first film layer 122 from sealing to the second film layer 124 forming an unsealed portion 192. The sealed portion 190 surrounds the unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 101, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 101 using a needle or other suitable injection device.

Figure 9:
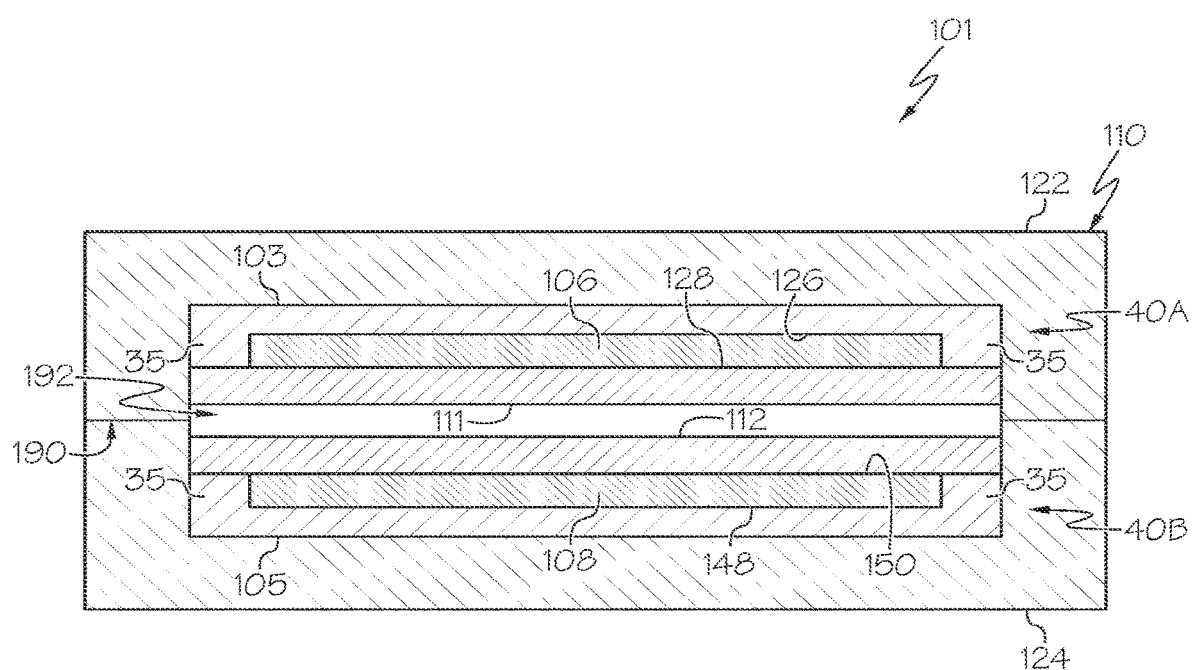
FIG. 9 schematically depicts a cross section of a first electrode assembly and a second electrode assembly positioned between a first film layer and a second film layer, according to one or more embodiments shown and described herein.

Referring now to FIGS. 3 and 4, the artificial muscle 101 is actuatable between a non-actuated state and an actuated state. In the non-actuated state, as shown in FIG. 9, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In the actuated state, as shown in FIG. 10, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 3, the artificial muscle 101 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought near or into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. The first electrode 106 and the second electrode 108 may be convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 4, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 480 of FIG. 15). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122, the first support polymer 103, and the first electrode insulator 111 to deform in a first axial direction along the center axis C of the first electrode 106 and causes the second film layer 124, the second support polymer 105, and the second electrode insulator 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 101 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "Hydraulically amplified self-healing electrostatic actuators with muscle-like performance" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 101 including two pairs of tab portions 132, 154 on each of the first electrode 106 and the second electrode 108, respectively, reduces the overall mass and thickness of the artificial muscle 101, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 101 provide zipping fronts that result in increased actuation power by providing localized and uniform hydraulic actuation of the artificial muscle 101 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 101 is actuated, expansion of the expandable fluid region 196 produces a force of 3 Newton-millimeters (N.mm) per cubic centimeter (cm3) of actuator volume or greater, such as 6 N.mm per cm3 or greater, 10 N.mm per cm3 or greater, 15 N.mm per cm3 or greater, 25 N.mm per cm3 or greater, 50 N.mm per cm3 or greater, 100 N.mm per cm3 or greater, or the like. Indeed, without intending to be limited by theory, increasing the dielectric constant of the first electrode insulator 111 and the second electrode insulator 112 causes a corresponding increase in the actuation force achievable by the artificial muscle 101. That is, the dielectric constant of the first electrode insulator 111 and the second electrode insulator 112 has a linear relationship with the achievable actuation force of the artificial muscle 101 such that doubling the dielectric constant of the first electrode insulator 111 and the second electrode insulator 112 doubles the achievable actuation force of the artificial muscle 101.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

Figure 5A:
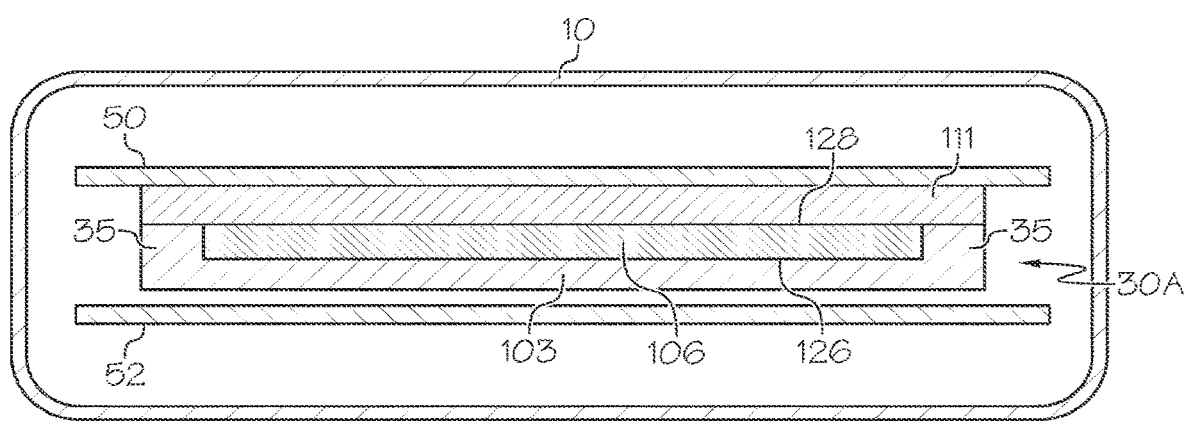
FIG. 5A schematically depicts a cross section of a layer stack comprising a first electrode positioned between a first electrode insulator and a first support polymer, the first layer stack disposed in a vacuum bag, according to one or more embodiments shown and described herein.
Figure 8:
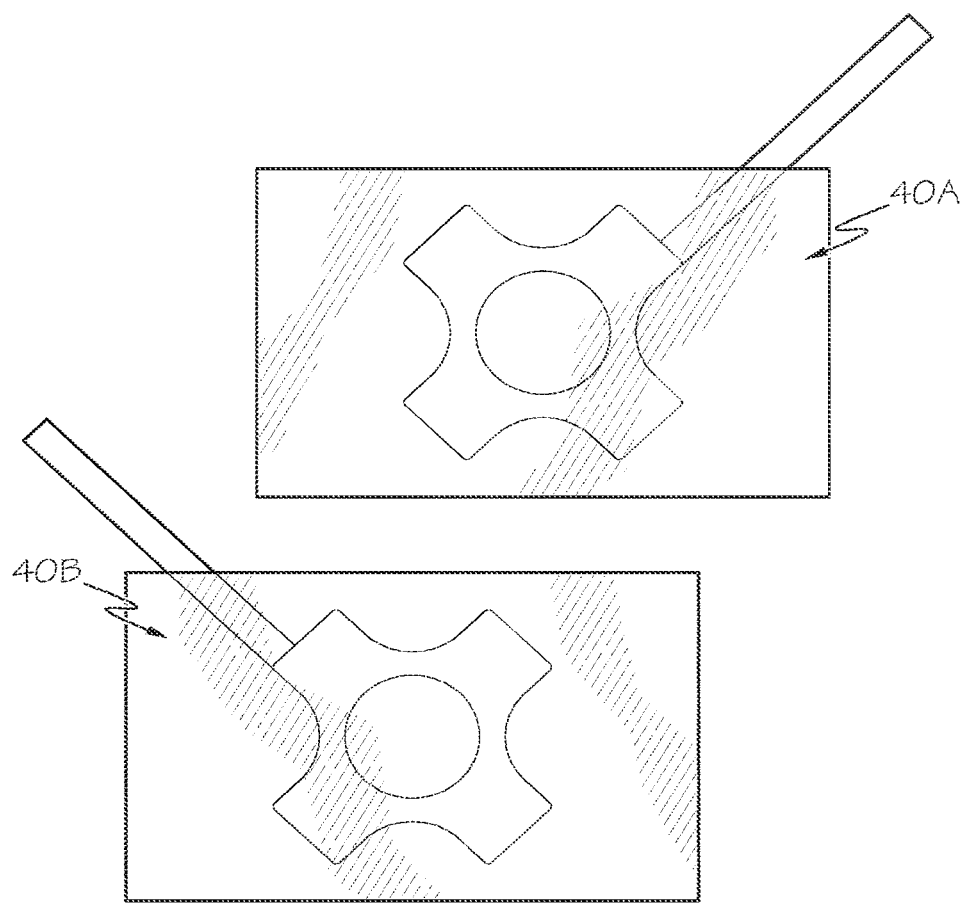
FIG. 8 schematically depicts a first electrode assembly and a second electrode assembly formed using the processes depicted in FIGS. 5A-7, according to one or more embodiments shown and described herein.

Referring now to FIGS. 5A-9 methods of manufacturing an artificial muscle, such as the artificial muscle 101 of FIGS. 1-4, that include a vacuum coupling process to directly couple an electrode, such the first electrode 106, to an electrode insulator, such as the first electrode insulator 111 will be described. FIGS. 5A and 5B depict a schematic cross section of a first layer stack 30A and a second layer stack 30B that comprise layers of material that may to be formed into a first electrode assembly 40A and a second electrode assembly 40B, respectively (FIGS. 8 and 9). The first electrode assembly 40A and the second electrode assembly 40B may be used to form the artificial muscle 101 of FIGS. 1-4, or other artificial muscles, such as the artificial muscles 201, 300, 300' described below with respect to FIGS. 10-14. The first layer stack 30A comprises the first electrode 106 positioned between the first electrode insulator 111 and the first support polymer 103, which undergo a vacuum sealing process and a heat sealing process to form the first electrode assembly 40A. The second layer stack 30B comprises the second electrode 108 positioned between the second electrode insulator 112 and the second support polymer 105, which undergo a vacuum sealing process and a heat sealing process to form the second electrode assembly 40B.

The first electrode insulator 111 and the second electrode insulator 112 may each comprise a high dielectric constant polymer. As used herein, a high dielectric constant polymer is a polymer comprising a dielectric constant of 3 or greater. In some embodiments, the high dielectric constant polymer may comprise a dielectric constant of 6 or greater. The high dielectric constant polymer may comprise a halogenated polymer, for example, a fluoropolymer polymer such as PVDF. Without intending to be limited by theory, polymers that contain a VDF (vinylidene difluoride) monomer typically have a high dielectric constant. Example PVDF polymers include PVDF homopolymers, P(VDF-HFP) (hexafluoropropylene) copolymers, P(VDF-CTFE) (chlorotrifluoroethylene) copolymers, P(VDF-TFE) (tetrafluoroethylene) copolymers, P(TFE-HFP-VDF) terpolymers, P(VDF-TrFE) copolymers. Additional high dielectric polymers include high dielectric constant terpolymers, such as P(VDF-TrFE-CFE) and P(VDF-TrFE-CTFE) terpolymers, which have a dielectric constant of from 20 to 50. Yet other high dielectric constant polymers include fluoropolymer thermoplastic elastomers, which include physically crosslinked, chemically crosslinkable fluoropolymers, and ferroelectric polymers. While the methods described herein are effective at overcoming the manufacturing difficulties of high dielectric constant polymers, it should be understood that the methods described herein may be used to form artificial muscles having a variety of electrode insulating polymers, including polymers with a dielectric constant below 3.

In addition, the first support polymer 103 and the second support polymer 105 each comprise an overhang portion 35 that extends laterally beyond the first electrode 106 and the second electrode 108, respectively. The overhang portion 35 facilitates direct contact between the electrode insulators 111, 112 and the support polymers 103, 105. This allows the overhang portion 35 of the support polymers 103, 105 to be heat sealed to the electrode insulators 111, 112 once the electrode insulators 111, 112 are vacuum coupled to the respective first electrode 106 and the second electrode 108.

Figure 6:
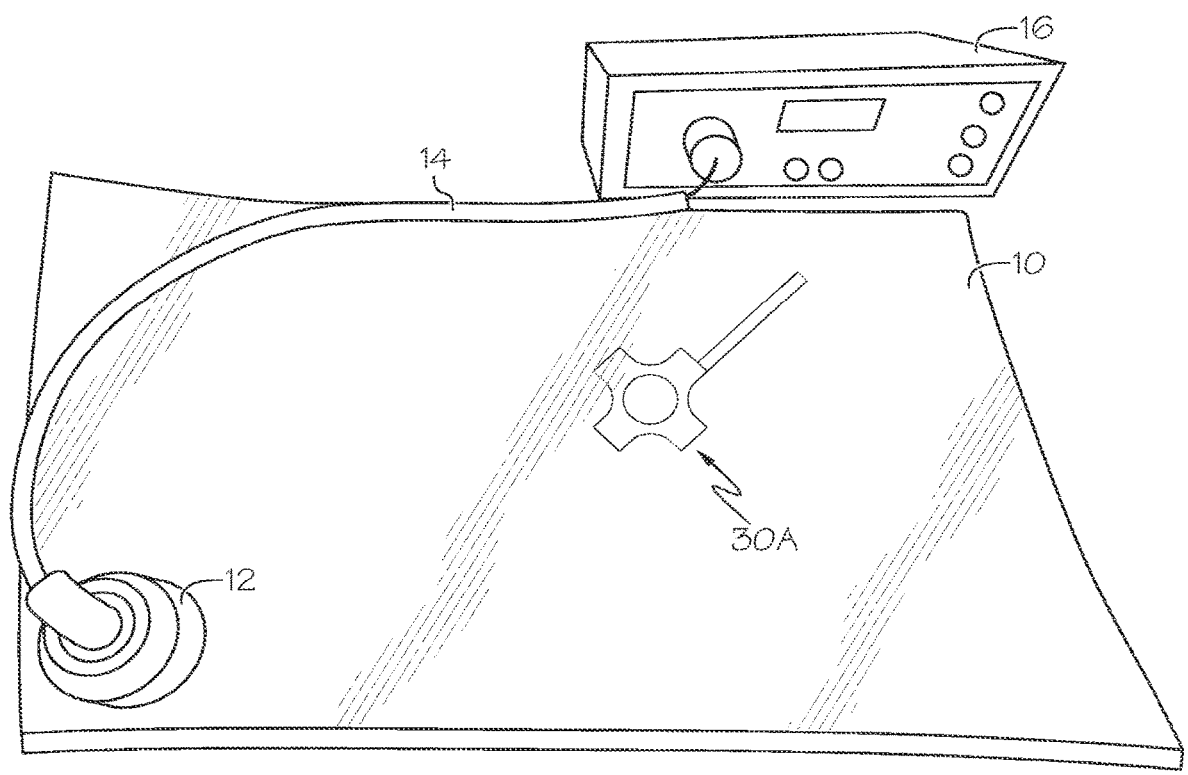
FIG. 6 schematically depicts the first layer stack of FIG. 5A positioned in a vacuum bag, according to one or more embodiments shown and described herein.

Referring now to FIG. 6, the first layer stack 30A is shown positioned in the vacuum bag 10. The vacuum bag 10 comprises a tube connector 12 having an opening for connecting a tube 14 to the vacuum bag 10, as shown in FIG. 6. The tube 14 is also connected to a fluid pump 16. Thus, the fluid pump 16 is fluidly coupled to the vacuum bag 10 using the tube 14. In operation, the fluid pump 16 is configured to remove air from the vacuum bag 10, thereby vacuum coupling the first electrode 106 of the first layer stack 30A to the first electrode insulator 111. Without intending to be limited by theory, both the first electrode 106 and the first electrode insulator 111 comprise some surface defects at the micron level. Once air has been removed from the vacuum bag 10 and thus also removed from the interface between the first electrode 106 and the first electrode insulator 111, a persistent vacuum is retained in the micron level gaps at the interface of the first electrode 106 and the first electrode insulator 111 caused by the presence of surface defects on both the first electrode 106 and the first electrode insulator 111. The persistent vacuum that is retained between the first electrode 106 and the first electrode insulator 111 allows the first electrode 106 and the first electrode insulator 111 to remain vacuum coupled after removal from the vacuum bag 10.

It should be understood that the second layer stack 30B may be similarly vacuum coupled to retain a persistent vacuum between the second electrode 108 and the second electrode insulator 112 of the second layer stack 30B. In some embodiments, both the first layer stack 30A and the second layer stack 30B may be positioned together in the vacuum bag 10 during the vacuum sealing operation and, in other embodiments, the first layer stack 30A and the second layer stack 30B may be vacuum sealed separately. Moreover, while the vacuum coupling techniques described herein facilitate the use of high dielectric constant polymers as the first and second electrode insulators 111, 112, these techniques also facilitate close, uniform contact between the first and second electrode insulators 111, 112 and the respective first and second electrodes 106, 108, which further improves artificial muscle performance.

Referring now to FIG. 7, a heat sealing process using a heat sealing device 18 is depicted. The first and second layer stacks 30A, 30B of FIGS. 5A and 5B may be heat sealed while positioned in the vacuum bag 10 and while air is removed from the vacuum bag 10. In some embodiments, both the first layer stack 30A and the second layer stack 30B may be positioned together in the vacuum bag 10 during the heat sealing operation and, in other embodiments, the first layer stack 30A and the second layer stack 30B may be heat sealed separately. In operation, heat sealing the first and second layer stacks 30A, 30B seals (i.e., heat seals) the first and second support polymers 103, 105 to respective first and second electrodes 106, 108. Thus, upon removal of each of the first and second layer stack 30A, 30B from the vacuum bag 10, the first support polymer 103 and the second support polymer 105 may be coupled to the first electrode 106 and the second electrode 108, respectively. Moreover, the overhang portions 35 of the first and second support polymers 103, 105 may be in direct contact with the first and second electrode insulators 111, 112, respectively. During the heat sealing process, the overhang portion 35 of the first support polymer 103 may heat seal to the first electrode insulator 111 and the overhang portion 35 of the second support polymer 105 may heat seal to the second electrode insulator 112. Indeed, while the first and second electrode insulators 111, 112 may comprises high dielectric polymers that do not effectively heat seal to an electrode, the material of the support polymers 103, 105 (e.g., BOPP) is amenable to heat sealing, facilitating coupling of the overhang portion 35 of the first and second support polymers 103, 105 to the first and second electrode insulators 111, 112, respectively. Thus, upon removal of each of the first and second layer stacks 30A, 30B from the vacuum bag 10, the first and second support polymers 103 are coupled to both the first and second electrodes 106, 108 and the first and second electrode insulators 111, 112, respectively.

Referring now to FIG. 8, a first electrode assembly 40A and a second electrode assembly 40B are depicted. The first electrode assembly 40A and the second electrode assembly 40B are formed using the vacuum sealing and heat sealing processes described above with respect to FIGS. 5-7. For example, the first electrode assembly 40A is formed by vacuum sealing and heat sealing the first layer stack 30A and the second electrode assembly 40B is formed by vacuum sealing and heat sealing the second layer stack 30B. Indeed, upon removal of the first and second layer stack 30A, 30B of the vacuum bag 10, each electrode 106, 108 remains vacuum coupled to the respective electrode insulators 111, 112 and the layer stacks 30A and 30B now comprises the first electrode assembly 40A and the second electrode assembly 40B.

Figure 5B:
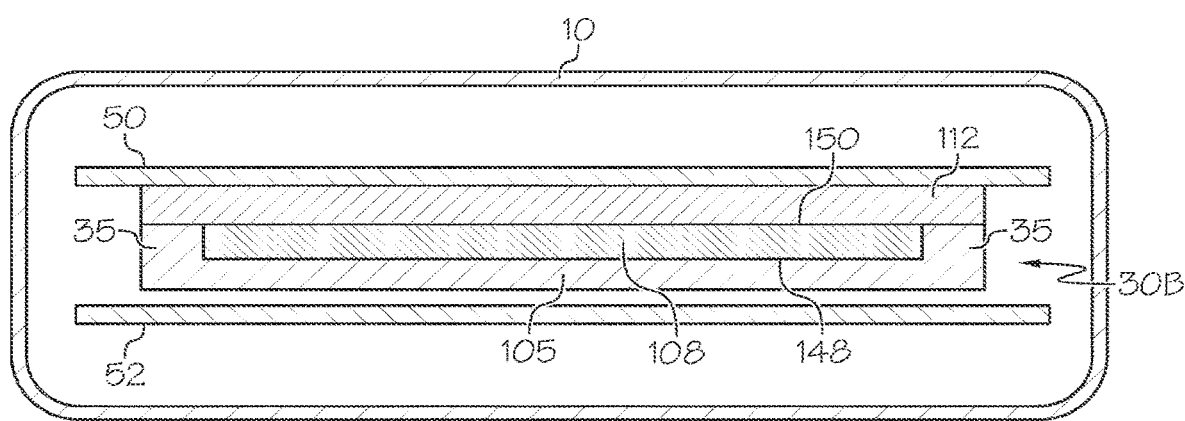
FIG. 5B schematically depicts a cross section of a second layer stack comprising a second electrode positioned between a second electrode insulator and a second support polymer, the second layer stack disposed in a vacuum bag, according to one or more embodiments shown and described herein.

Referring again to FIGS. 5A and 5B, a first heat release layer 50 and a second heat release layer 52 may be positioned in the vacuum bag 10 to aid during the vacuum sealing and heat sealing processes of the methods described herein. In FIG. 5A, the first heat release layer 50 is positioned between the first electrode insulator 111 and the vacuum bag 10 and the second heat release layer 52 is positioned between the first support polymer 103 and the vacuum bag 10. In FIG. 5B, the first heat release layer 50 is positioned between the second electrode insulator 112 and the vacuum bag 10 and the second heat release layer 52 is positioned between the second support polymer 105 and the vacuum bag 10. Indeed, the first and second heat release layers 50, 52 are positioned on opposite sides of each layer stack 30A, 30B. In operation, the first heat release layer 50 and the second heat release layer 52 prevent the layer stacks 30A, 30B from coupling to the vacuum bag 10 during the vacuum sealing and heat sealing steps. After the heat sealing step, the first and second heat release layers 50, 52 may be removed from contact with the layer stacks 30A, 30B. The first and second heat release layers 50, 52 comprise a material with a limited texture, such as carbon fiber resin or paper. Furthermore, the first and second heat release layers 50, 52 may comprises a porous material that allows some airflow through the porous material.

Referring now to FIGS. 8 and 9, the first electrode assembly 40A and the second electrode assembly 40B may be used to form an artificial muscle, such as the artificial muscle 101 of FIGS. 1-4. FIG. 8 schematically depicts a cross-section of the first electrode assembly 40A and the second electrode assembly 40B positioned between the first film layer 122 and the second film layer 124. In particular, to form the artificial muscle 101, once the first and second electrode assemblies 40A, 40B are manufactured, the first electrode assembly 40A and the second electrode assembly 40B may be placed in a stacked arrangement between the first film layer 122 and the second film layer 124. In the stacked arrangement, the first electrode insulator 111 of the first electrode assembly 40A faces the second electrode insulator 112 of the second electrode assembly 40B, the first support polymer 103 of the first electrode assembly 40A faces the first film layer 122, and the second support polymer 105 of the second electrode assembly 40B faces the second film layer 124.

To form an artificial muscle, such as the first artificial muscle 101 of FIGS. 1-4, the first film layer 122 is sealed to the second film layer 124 to form the housing 110 which houses the first and second electrode assemblies 40A, 40B. Heat sealing the first film layer 122 to the second film layer 124 may also heat seal the first and second film layers 122, 124 to the first and second support polymer 103, 105 of the first and second electrode assemblies 40A, 40B, respectively. Furthermore, sealing the first film layer 122 to the second film layer 124 defines the sealed portion 190 of the housing 110, surrounding the unsealed portion 192 surrounded by the sealed portion 190 of the housing 110. Once the first electrode assembly 40A is sealed to the second electrode assembly 40B to form the artificial muscle 101, dielectric fluid 198 (FIGS. 1-4) may be injected into the artificial muscle between the first electrode assembly 40A and the second electrode assembly 40B.

Referring now to FIGS. 10 and 11, another embodiment of an artificial muscle 201 that may be formed using the methods of FIGS. 5A-9 is illustrated. The artificial muscle 201 is substantially similar to the artificial muscle 101. As such, like structure is indicated with like reference numerals. However, as shown, the first electrode 106 does not include a central opening. Thus, only the second electrode 108 includes the central opening 168 formed therein. As shown in FIG. 10, the artificial muscle 201 is in the non-actuated state with the first electrode 106 being planar and the second electrode 108 being convex relative to the first electrode 106. In the non-actuated state, the expandable fluid region 196 has a first height H3. In the actuated state, as shown in FIG. 11, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 201. In addition, because the total deformation is formed on only one side of the artificial muscle 201, the second height H4 of the expandable fluid region 196 of the artificial muscle 201 extends further from a longitudinal axis perpendicular to the central axis C of the artificial muscle 201 than the second height H2 of the expandable fluid region 196 of the artificial muscle 101 when all other dimensions, orientations, and volume of dielectric fluid are the same.

Figure 12:
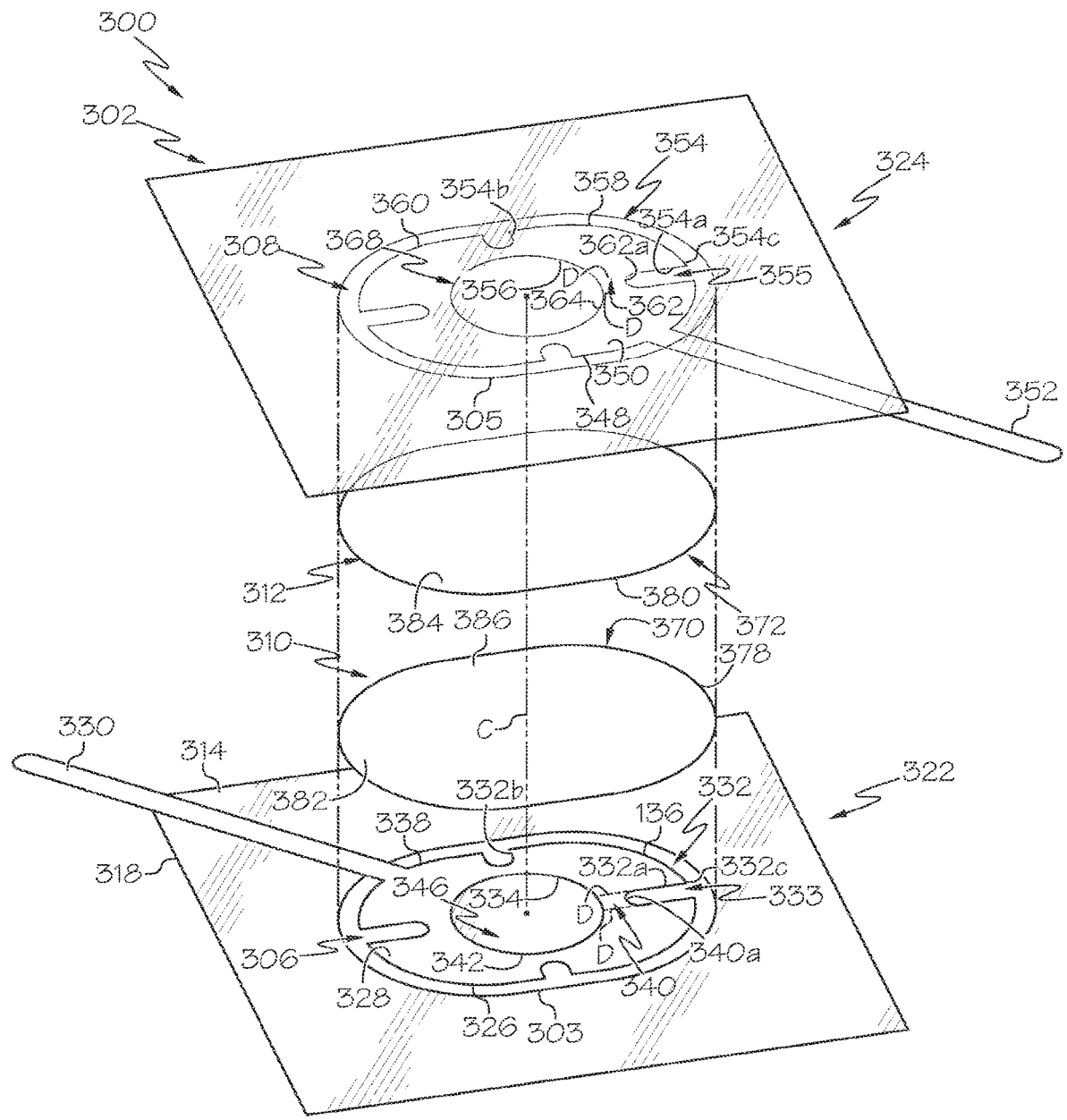
FIG. 12 schematically depicts an exploded view of another illustrative artificial muscle, according to one or more embodiments shown and described herein.
Figure 13:
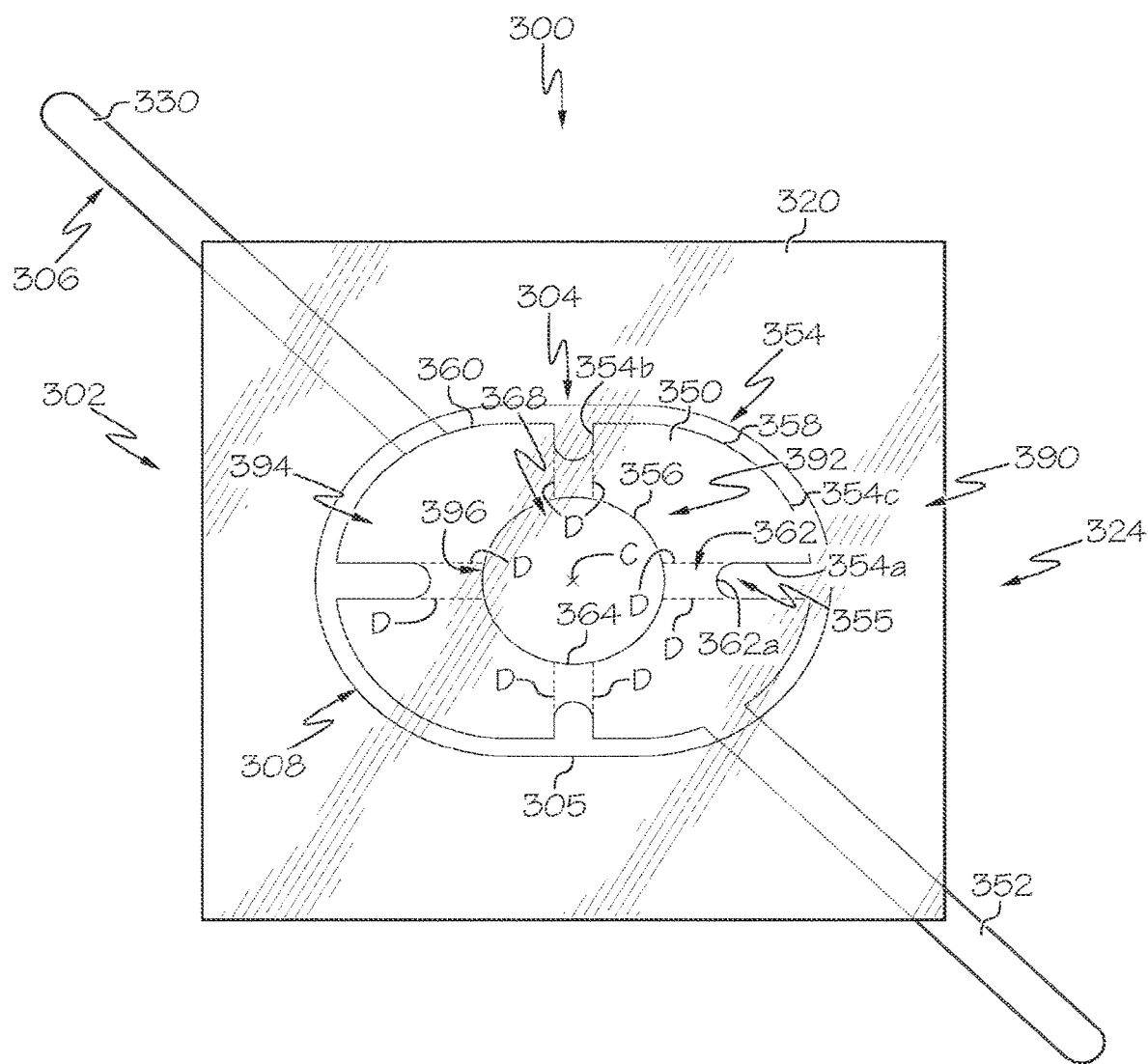
FIG. 13 schematically depicts a top view of the artificial muscle of FIG. 12, according to one or more embodiments shown and described herein.
Figure 14:
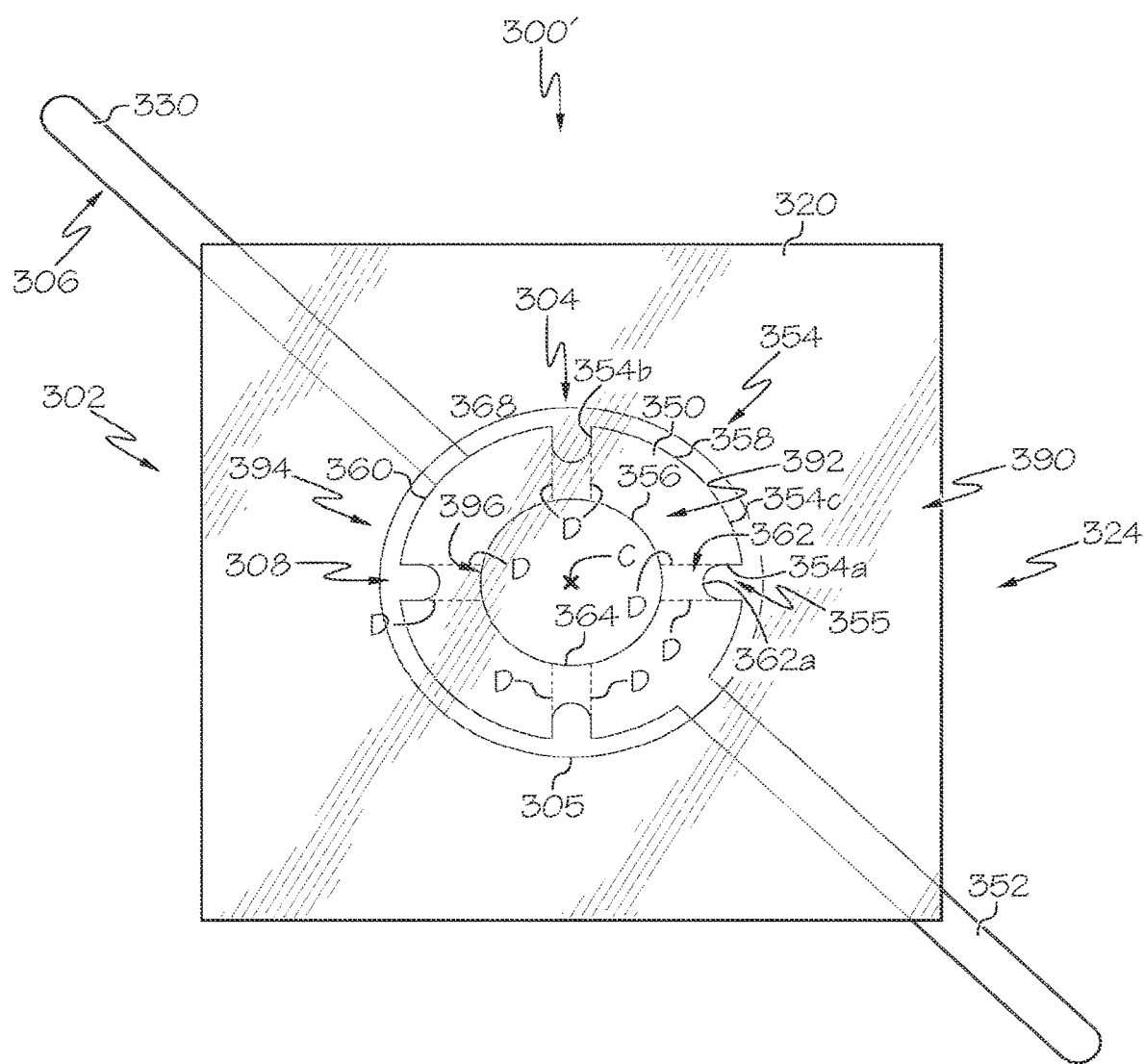
FIG. 14 schematically depicts a top view of another artificial muscle, according to one or more embodiments shown and described herein.

As shown in FIGS. 12-14, another embodiment of an artificial muscle 300 that may be formed using the methods of FIGS. 5A-9 is illustrated. It should be appreciated that the artificial muscle 300 includes similar structure as the artificial muscle 101 (FIG. 1) and therefore operates similarly in operation to the artificial muscle 101 (FIG. 1). Notably, the artificial muscle 300 includes fan portions 332 in place of the tab portions 132 (FIG. 1) discussed in relation to the artificial muscle 101 (FIG. 1). However, it should be understood that both the fan portions 332 of the artificial muscle 300 and the tab portions 132 are each generally a radially extending portion of an electrode of an artificial muscle, are positioned adjacent bridge portions, and provide a zipping functionality, as described above with respect to the artificial muscle 101 and 201, and below with respect to the artificial muscle 300. Indeed, these radially extending portions (e.g., tab portions and fan portions) each provide increased actuator power per unit volume, while minimizing buckling and rupture during operation.

Referring now to FIGS. 12 and 13, the artificial muscle 300 includes a housing 302, an electrode pair 304, including a first electrode 306 and a second electrode 308, fixed to opposite surfaces of the housing 302, a first electrode insulator 310 fixed to the first electrode 306, and a second electrode insulator 312 fixed to the second electrode 308. In some embodiments, the housing 302 is a one-piece monolithic layer including a pair of opposite inner surfaces, such as a first inner surface 314 and a second inner surface 316, and a pair of opposite outer surfaces, such as a first outer surface 318 and a second outer surface 320. In some embodiments, the first inner surface 314 and the second inner surface 316 of the housing 302 are heat-sealable. In other embodiments, the housing 302 may be a pair of individually fabricated film layers, such as a first film layer 322 and a second film layer 324. Thus, the first film layer 322 includes the first inner surface 314 and the first outer surface 318, and the second film layer 324 includes the second inner surface 316 and the second outer surface 320.

Throughout the ensuing description, reference may be made to the housing 302 including the first film layer 322 and the second film layer 324, as opposed to the one-piece housing. It should be understood that either arrangement is contemplated. In some embodiments, the first film layer 322 and the second film layer 324 generally include the same structure and composition. For example, in some embodiments, the first film layer 322 and the second film layer 324 each comprise BOPP.

As shown in FIG. 12, the artificial muscle 300 may further comprise a first support polymer 303 positioned between the first electrode 306 and the first inner surface 314 of the housing 302 and a second support polymer 305 positioned between the second electrode 308 and the second inner surface 316 of the housing 302. As described above, the first and second support polymers 303, 305 assist the vacuum coupling processes that allows for the use of high dielectric polymers as the first and second electrode insulators 310, 312. In some embodiments, the first support polymer 303 and the second support polymer 305 generally include the same structure and composition. For example, in some embodiments, the first support polymer 303 and the second support polymer 305 each comprise BOPP.

The first electrode 306 and the second electrode 308 are each positioned between the first film layer 322 and the second film layer 324. In some embodiments, the first electrode 306 and the second electrode 308 are each aluminum-coated polyester such as, for example, Mylar®. However, it should be understood that the first electrode 306 and the second electrode 308 may comprise other electrically coupled materials, such as copper, silver, titanium, platinum, or the like, which may be coated with a polyester such as Mylar®. The first electrode 306 and the second electrode 308 may comprise flexible materials or inflexible materials (e.g., rigid materials) and in some embodiments may comprise stretchable materials. Moreover, embodiments are contemplated in which the first electrode 306 and the second electrode 308 comprise a hydrogel material. In addition, one of the first electrode 306 and the second electrode 308 is a negatively charged electrode and the other of the first electrode 306 and the second electrode 308 is a positively charged electrode. For purposes discussed herein, either electrode 306, 308 may be positively charged so long as the other electrode 306, 308 of the artificial muscle 300 is negatively charged.

The first electrode 306 has a film-facing surface 326 and an opposite inner surface 328. The first electrode 306 is positioned proximate the first film layer 322, specifically, the first inner surface 314 of the first film layer 322. That is, the first electrode 306 may be in contact with the first inner surface 314 of the first film layer 322 or in contact with the first support polymer 303 which is disposed between the first electrode 306 and the first inner surface 314 of the first film layer 322. In addition, the first electrode 306 includes a first terminal 330 extending from the first electrode 306 past an edge of the first film layer 322 such that the first terminal 330 can be connected to a power supply to actuate the first electrode 306. Specifically, the terminal is coupled, either directly or in series, to a power supply and a controller of the actuation system 400 (FIG. 15). Similarly, the second electrode 308 has a film-facing surface 348 and an opposite inner surface 350. The second electrode 308 is positioned proximate the second film layer 324, specifically, the second inner surface 316 of the second film layer 324. That is, the second electrode 308 may be in contact with the second inner surface 316 of the second film layer 324 or in contact with the second support polymer 305 which is disposed between the second electrode 308 and the second inner surface 316 of the second film layer 324. The second electrode 308 includes a second terminal 352 extending from the second electrode 308 past an edge of the second film layer 324 such that the second terminal 352 can be connected to a power supply and a controller of the actuation system 400 (FIG. 15) to actuate the second electrode 308.

With respect now to the first electrode 306, the first electrode 306 includes two or more fan portions 332 extending radially from a center axis C of the artificial muscle 300. In some embodiments, the first electrode 306 includes only two fan portions 332 positioned on opposite sides or ends of the first electrode 306. In some embodiments, the first electrode 306 includes more than two fan portions 332, such as three, four, or five fan portions 332. In embodiments in which the first electrode 306 includes an even number of fan portions 332, the fan portions 332 may be arranged in two or more pairs of fan portions 332. As shown in FIG. 12, the first electrode 306 includes four fan portions 332. In this embodiment, the four fan portions 332 are arranged in two pairs of fan portions 332, where the two individual fan portions 332 of each pair are diametrically opposed to one another.

Each fan portion 332 has a first side edge 332a and an opposite second side edge 332b. As shown, the first terminal 330 extends from a second end 336 of one of the fan portions 332 and is integrally formed therewith. A channel 333 is at least partially defined by opposing side edges 332a, 332b of adjacent fan portions 332 and, thus, extends radially toward the center axis C. The channel 333 terminates at an end 340a of a bridge portion 340 interconnecting adjacent fan portions 332.

As shown in FIG. 12, dividing lines D are included to depict the boundary between the fan portions 332 and the bridge portions 340. The dividing lines D extend from the side edges 332a, 332b of the fan portions 332 to a first end 334 of the fan portions 332 collinear with the side edges 332a, 332b. It should be understood that dividing lines D are shown in FIG. 13 for clarity and that the fan portions 332 are integral with the bridge portions 340. The first end 334 of the fan portion 332, which extends between adjacent bridge portions 340, defines an inner length of the fan portion 332. Due to the geometry of the fan portion 332 tapering toward the center axis C between the first side edge 332a and the second side edge 332b, the second end 336 of the fan portion 332 defines an outer length of the fan portion 332 that is greater than the inner length of the fan portion 332.

Moreover, each fan portion 332 has a pair of corners 332c defined by an intersection of the second end 336 and each of the first side edge 332a and the second side edge 332b of the fan portion 332. In embodiments, the corners 332c are formed at an angle equal to or less than 90 degrees. In other embodiments, the corners 332c are formed at an acute angle.

As shown in FIG. 12, each fan portion 332 has a first side length defined by a distance between the first end 334 of the fan portion 332 and the second end 336 of the fan portion 332 along the first side edge 332a and the dividing line D that is collinear with the first side edge 332a. Each fan portion 332 also has a second side length defined by a distance between the first end 334 of the fan portion 332 and the second end 336 of the fan portion 332 along the second side edge 332b and the dividing line D that is collinear with the second side edge 332b. In embodiments, the first side length is greater than the second side length of the fan portion 332 such that the first electrode 306 has an ellipsoid geometry.

The second end 336, the first side edge 332a and the second side edge 332b of each fan portion 332, and the bridge portions 340 interconnecting the fan portions 332 define an outer perimeter 338 of the first electrode 306. In embodiments, a central opening 346 is formed within the first electrode 306 between the fan portions 332 and the bridge portions 340, and is coaxial with the center axis C. Each fan portion 332 has a fan length extending from a perimeter 342 of the central opening 346 to the second end 336 of the fan portion 332. Each bridge portion 340 has a bridge length extending from a perimeter 342 of the central opening 346 to the end 340a of the bridge portion 340, i.e., the channel 333. As shown, the bridge length of each of the bridge portions 340 is substantially equal to one another. Each channel 333 has a channel length defined by a distance between the end 340a of the bridge portion 340 and the second end of the fan portion 332. Due to the bridge length of each of the bridge portions 340 being substantially equal to one another and the first side length of the fan portions 332 being greater than the second side length of the fan portions 332, a first pair of opposite channels 333 has a channel length greater than a channel length of a second pair of opposite channels 333. As shown, a width of the channel 333 extending between opposing side edges 332a, 332b of adjacent fan portions 332 remains substantially constant due to opposing side edges 332a, 332b being substantially parallel to one another.

In embodiments, the central opening 346 has a radius of 2 centimeters (cm) to 5 cm. In embodiments, the central opening 346 has a radius of 3 cm to 4 cm. In embodiments, a total fan area of each of the fan portions 332 is equal to or greater than twice an area of the central opening 346. It should be appreciated that the ratio between the total fan area of the fan portions 332 and the area of the central opening 346 is directly related to a total amount of deflection of the first film layer 322 when the artificial muscle 300 is actuated. In embodiments, the bridge length is 20% to 50% of the fan length. In embodiments, the bridge length is 30% to 40% of the fan length. In embodiments in which the first electrode 306 does not include the central opening 346, the fan length and the bridge length may be measured from a perimeter of an imaginary circle coaxial with the center axis C.

Similar to the first electrode 306, the second electrode 308 includes two or more fan portions 354 extending radially from the center axis C of the artificial muscle 300. The second electrode 308 includes substantially the same structure as the first electrode 306 and, thus, includes the same number of fan portions 354. Specifically, the second electrode 308 is illustrated as including four fan portions 354. However, it should be appreciated that the second electrode 308 may include any suitable number of fan portions 354.

Each fan portion 354 of the second electrode 308 has a first side edge 354a and an opposite second side edge 354b. As shown, the second terminal 352 extends from a second end 358 of one of the fan portions 354 and is integrally formed therewith. A channel 355 is at least partially defined by opposing side edges 354a, 354b of adjacent fan portions 354 and, thus, extends radially toward the center axis C. The channel 355 terminates at an end 362a of a bridge portion 362 interconnecting adjacent fan portions 354.

As shown in FIG. 12, additional dividing lines D are included to depict the boundary between the fan portions 354 and the bridge portions 362. The dividing lines D extend from the side edges 354a, 354b of the fan portions 354 to the first end 356 of the fan portions 354 collinear with the side edges 354a, 354b. It should be understood that dividing lines D are shown in FIG. 13 for clarity and that the fan portions 354 are integral with the bridge portions 362. The first end 356 of the fan portion 354, which extends between adjacent bridge portions 362, defines an inner length of the fan portion 354. Due to the geometry of the fan portion 354 tapering toward the center axis C between the first side edge 354a and the second side edge 354b, the second end 358 of the fan portion 354 defines an outer length of the fan portion 354 that is greater than the inner length of the fan portion 354.

Moreover, each fan portion 354 has a pair of corners 354c defined by an intersection of the second end 358 and each of the first side edge 354a and the second side edge 354b of the fan portion 354. In embodiments, the corners 354c are formed at an angle equal to or less than 90 degrees. In other embodiments, the corners 354c are formed at an acute angle. During actuation of the artificial muscle 300, the corners 332c of the first electrode 306 and the corners 354c of the second electrode 308 are configured to be attracted to one another at a lower voltage as compared to the rest of the first electrode 306 and the second electrode 308. Thus, actuation of the artificial muscle 300 initially at the corners 332c, 354c results in the outer perimeter 338 of the first electrode 306 and the outer perimeter 360 of the second electrode 308 being attracted to one another at a lower voltage and reducing the likelihood of air pockets or voids forming between the first electrode 306 and the second electrode 308 after actuation of the artificial muscle 300.

As shown in FIGS. 12 and 13, in embodiments, the first side edge 354a of each fan portion 354 has a first side length defined by a distance between the first end 356 of the fan portion 354 and the second end 358 of the fan portion 354 along the first side edge 354a and the dividing line D that is collinear with the first side edge 354a. Each fan portion 354 also has a second side length defined by a distance between the first end 356 of the fan portion 354 and the second end 358 of the fan portion 354 along the second side edge 354b and the dividing line D that is collinear with the second side edge 354b. In embodiments, the first side length is greater than the second side length of the fan portion 354 such that the second electrode 308 has an ellipsoid geometry corresponding to the geometry of the first electrode 306.

The second end 358, the first side edge 354a and the second side edge 354b of each fan portion 354, and the bridge portions 362 interconnecting the fan portions 354 define an outer perimeter 360 of the second electrode 308. In embodiments, a central opening 368 is formed within the second electrode 308 between the fan portions 354 and the bridge portions 362, and is coaxial with the center axis C. Each fan portion 354 has a fan length extending from a perimeter 364 of the central opening 368 to the second end 358 of the fan portion 354. Each bridge portion 362 has a bridge length extending from the central opening 368 to the end 362a of the bridge portion 362, i.e., the channel 355. As shown, the bridge length of each of the bridge portions 362 is substantially equal to one another. Each channel 355 has a channel length defined by a distance between the end 362a of the bridge portion 362 and the second end of the fan portion 354. Due to the bridge length of each of the bridge portions 362 being substantially equal to one another and the first side length of the fan portions 354 being greater than the second side length of the fan portions 354, a first pair of opposite channels 355 has a channel length greater than a channel length of a second pair of opposite channels 355. As shown, a width of the channel 355 extending between opposing side edges 354a, 354b of adjacent fan portions 354 remains substantially constant due to opposing side edges 354a, 354b being substantially parallel to one another.

In embodiments, the central opening 368 has a radius of 2 cm to 5 cm. In embodiments, the central opening 368 has a radius of 3 cm to 4 cm. In embodiments, a total fan area of each of the fan portions 354 is equal to or greater than twice an area of the central opening 368. It should be appreciated that the ratio between the total fan area of the fan portions 354 and the area of the central opening 368 is directly related to a total amount of deflection of the second film layer 324 when the artificial muscle 300 is actuated. In embodiments, the bridge length is 20% to 50% of the fan length. In embodiments, the bridge length is 30% to 40% of the fan length. In embodiments in which the second electrode 308 does not include the central opening 368, the fan length and the bridge length may be measured from a perimeter of an imaginary circle coaxial with the center axis C.

As described herein, the first electrode 306 and the second electrode 308 each have a central opening 346, 368 coaxial with the center axis C. However, it should be understood that the first electrode 306 does not need to include the central opening 346 when the central opening 368 is provided within the second electrode 308. Alternatively, the second electrode 308 does not need to include the central opening 368 when the central opening 346 is provided within the first electrode 306.

Referring again to FIG. 12, the first electrode insulator 310 and the second electrode insulator 312 have a substantially ellipsoid geometry generally corresponding to the geometry of the first electrode 306 and the second electrode 308, respectively. Thus, the first electrode insulator 310 and the second electrode insulator 312 each have fan portions 370, 372 and bridge portions 374, 376 corresponding to like portions on the first electrode 306 and the second electrode 308. However, the first electrode insulator 310 and the second electrode insulator 312 each have an outer perimeter 378, 380 that extends laterally beyond the outer perimeter 338 of the outer perimeter 338 of the first electrode 306 and the outer perimeter 360 of the second electrode 308, respectively, when positioned thereon. This facilitates coupling between the first electrode insulator 310 and the first support polymer 303 and between the second electrode insulator 312 and the second support polymer 305. However, it should be understood that embodiments are contemplated in which the outer perimeter 378, 380 of the first electrode insulator 310 and the second electrode insulator 312 correspond to the outer perimeter 338 of the first electrode 306 and the outer perimeter 360 of the second electrode 308, respectively, when positioned thereon.

It should be appreciated that, in some embodiments, the first electrode insulator 310 and the second electrode insulator 312 generally include the same structure and composition. As such, in some embodiments, the first electrode insulator 310 and the second electrode insulator 312 each include an first surface 382, 384 and an opposite second surface 386, 388, respectively. In some embodiments, the first electrode insulator 310 and the second electrode insulator 312 are each a polymer material that is vacuum coupled to the inner surface 328 of the first electrode 306 and the inner surface 350 of the second electrode 308, respectively. For example, the first electrode insulator 310 and the second electrode insulator 312 may comprise a high dielectric constant polymer.

Referring now to FIG. 13, the artificial muscle 300 is shown in its assembled form with the first terminal 330 of the first electrode 306 and the second terminal 352 of the second electrode 308 extending past an outer perimeter of the housing 302, i.e., the first film layer 322 (FIG. 12) and the second film layer 324. The second electrode 308 is stacked on top of the first electrode 306 and, therefore, the first film layer 322 (FIG. 12) is not shown. Referring now to FIGS. 12 and 13, in its assembled form, the first electrode 306, the second electrode 308, the first electrode insulator 310, the second electrode insulator 312, the first support polymer 303, and the second support polymer 305 are sandwiched between the first film layer 322 and the second film layer 324. The first film layer 322 is partially sealed to the second film layer 324 at an area surrounding the outer perimeter 338 of the first electrode 306 and the outer perimeter 360 of the second electrode 308. In some embodiments, the first film layer 322 is heat-sealed to the second film layer 324. Specifically, in some embodiments, the first film layer 322 is sealed to the second film layer 324 to define a sealed portion 390 surrounding the first electrode 306 and the second electrode 308. The first film layer 322 (FIG. 12) and the second film layer 324 may be sealed in any suitable manner, such as using an adhesive, heat sealing, vacuum sealing, or the like.

Referring still to FIGS. 12 and 13, the first electrode 306, the second electrode 308, the first electrode insulator 310, and the second electrode insulator 312, the first support polymer 303, and the second support polymer 305 provide a barrier that prevents the first film layer 322 from sealing to the second film layer 324, forming an unsealed portion 392. The unsealed portion 392 of the housing 302 includes an electrode region 394, in which the electrode pair 304 is provided, and an expandable fluid region 396, which is surrounded by the electrode region 394. The central openings 346, 368 of the first electrode 306 and the second electrode 308 define the expandable fluid region 396 and are arranged to be axially stacked on one another. Although not shown, the housing 302 may be cut to conform to the geometry of the electrode pair 304 and reduce the size of the artificial muscle 300, namely, the size of the sealed portion 390. A dielectric fluid is provided within the unsealed portion 392 and flows freely between the first electrode 306 and the second electrode 308.

Referring now to FIG. 14, an alternative embodiment of an artificial muscle 300' is illustrated. It should be appreciated that the artificial muscle 300' is similar to the artificial muscle 300 described herein. As such, like structure is indicated with like reference numerals. The first electrode 306 and the second electrode 308 of the artificial muscle 300' have a circular geometry as opposed to the ellipsoid geometry of the first electrode 306 and the second electrode 308 of the artificial muscle 300 described herein. As shown in FIG. 14, with respect to the second electrode 308, a first side edge length of the first side edge 354a is equal to a second side edge length of the second side edge 354b. Accordingly, the channels 355 formed between opposing side edges 354a, 354b of the fan portions 354 each have an equal length. Although the first electrode 306 is hidden from view in FIG. 15 by the second electrode 308, it should be appreciated that the first electrode 306 also has a circular geometry corresponding to the geometry of the second electrode 308.

Referring now to FIGS. 12 and 13, actuation of the artificial muscle 300 will be discussed. In the non-actuated state, the first electrode 306 and the second electrode 308 are partially spaced apart from one another proximate the central openings 346, 368 thereof and the first end 334, 356 of the fan portions 332, 354. The second end 336, 358 of the fan portions 332, 354 remain in position relative to one another due to the housing 302 being sealed at the outer perimeter 338 of the first electrode 306 and the outer perimeter 360 of the second electrode 308. This is depicted in FIG. 3 with respect to artificial muscle 101, which operates in the same manner. In the actuated state, the first electrode 306 and the second electrode 308 are brought into contact with and oriented parallel to one another to force the dielectric fluid 398 into the expandable fluid region 396.

This causes the dielectric fluid 398 to flow through the central openings 346, 368 of the first electrode 306 and the second electrode 308 and inflate the expandable fluid region 396. This is depicted in FIG. 4 with respect to artificial muscle 101, which operates in the same manner.

In the non-actuated state, a distance between the first end 334 of the fan portion 332 of the first electrode 306 and the first end 356 of the fan portion 354 of the second electrode 308 is greater than a distance between the second end 336 of the fan portion 332 of the first electrode 306 and the second end 358 of the fan portion 354 of the second electrode 308. This results in the electrode pair 304 zippering toward the expandable fluid region 396 when actuated. When actuated, the first electrode 306 and the second electrode 308 zipper toward one another from the second ends 336, 358 of the fan portions 332, 354 thereof, thereby pushing the dielectric fluid 398 into the expandable fluid region 396. When in the actuated state, the first electrode 306 and the second electrode 308 are parallel to one another. In the actuated state, the dielectric fluid 398 flows into the expandable fluid region 396 to inflate the expandable fluid region 396. As such, the first film layer 322 and the second film layer 324 expand in opposite directions.

Referring now to FIG. 15, an actuation system 400 may be provided for operating the artificial muscles 101, 201, 300, 300'. The actuation system 400 may comprise a controller 500, an operating device 460, a power supply 480, a display device 420, network interface hardware 440, and a communication path 410 communicatively coupling these components. The controller 500 comprises a processor 520 and a non-transitory electronic memory 540 to which various components are communicatively coupled. In some embodiments, the processor 520 and the non-transitory electronic memory 540 and/or the other components are included within a single device. In other embodiments, the processor 520 and the non-transitory electronic memory 540 and/or the other components may be distributed among multiple devices that are communicatively coupled. The controller 500 includes non-transitory electronic memory 540 that stores a set of machine-readable instructions. The processor 520 executes the machine-readable instructions stored in the non-transitory electronic memory 540. The non-transitory electronic memory 540 may comprise RAM, ROM, flash memories, hard drives, or any device capable of storing machine-readable instructions such that the machine-readable instructions can be accessed by the processor 520. Accordingly, the actuation system 400 described herein may be implemented in any conventional computer programming language, as pre-programmed hardware elements, or as a combination of hardware and software components. The non-transitory electronic memory 540 may be implemented as one memory module or a plurality of memory modules. In some embodiments, the non-transitory electronic memory 540 includes instructions for executing the functions of the actuation system 400. The instructions may include instructions for actuating the artificial muscles 101, 201, 300, 300'.

The processor 520 may be any device capable of executing machine-readable instructions. For example, the processor 520 may be an integrated circuit, a microchip, a computer, or any other computing device. The non-transitory electronic memory 540 and the processor 520 are coupled to the communication path 410 that provides signal interconnectivity between various components and/or modules of the actuation system 400. Accordingly, the communication path 410 may communicatively couple any number of processors with one another, and allow the modules coupled to the communication path 410 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 15, the communication path 410 communicatively couples the processor 520 and the non-transitory electronic memory 540 of the controller 500 with a plurality of other components of the actuation system 400. For example, the actuation system 400 depicted in FIG. 15 includes the processor 520 and the non-transitory electronic memory 540 communicatively coupled with the operating device 460 and the power supply 480.

The operating device 460 allows for a user to control operation of the artificial muscle 101, 201, 300, 300'. In some embodiments, the operating device 460 may be a switch, toggle, button, or any combination of controls to provide user operation. The operating device 460 is coupled to the communication path 410 such that the communication path 410 communicatively couples the operating device 460 to other modules of the actuation system 400.

The power supply 480 (e.g., battery) provides power to the artificial muscle 101, 201, 300, 300'. In some embodiments, the power supply 480 is a rechargeable direct current power source. It is to be understood that the power supply 480 may be a single power supply or battery for providing power to the artificial muscles 101, 201, 300, 300'. A power adapter (not shown) may be provided and electrically coupled via a wiring harness or the like for providing power to the artificial muscle 101, 201, 300, 300' via the power supply 480. Indeed, the power supply 480 is a device that can receive power at one level (e.g., one voltage, power level, or current) and output power at a second level (e.g., a second voltage, power level, or current).

In some embodiments, the actuation system 400 also includes a display device 420. The display device 420 is coupled to the communication path 410 such that the communication path 410 communicatively couples the display device 420 to other modules of the actuation system 400. The display device 420 may output a notification in response to an actuation state of the artificial muscle 101, 201, 300, 300' or indication of a change in the actuation state of the artificial muscle 101, 201, 300, 300'. Moreover, the display device 420 may be a touchscreen that, in addition to providing optical information, detects the presence and location of a tactile input upon a surface of or adjacent to the display device 420. Accordingly, the display device 420 may include the operating device 460 and receive mechanical input directly upon the optical output provided by the display device 420.

In some embodiments, the actuation system 400 includes network interface hardware 440 for communicatively coupling the actuation system 400 to a portable device 580 via a network 560. The portable device 580 may include, without limitation, a smartphone, a tablet, a personal media player, or any other electric device that includes wireless communication functionality. It is to be appreciated that, when provided, the portable device 580 may serve to provide user commands to the controller 500, instead of the operating device 460. As such, a user may be able to control or set a program for controlling the artificial muscle 101, 201, 300, 300' utilizing the controls of the operating device 460. Thus, the artificial muscle 101, 201, 300, 300' may be controlled remotely via the portable device 580 wirelessly communicating with the controller 500 via the network 560.

It should now be understood that embodiments described herein are directed to artificial muscles and methods of manufacturing artificial muscles using a vacuum sealing process, which facilitates the use of certain high performance electrode insulators that are unable to effectively heat seal. In particular, the vacuum sealing techniques described herein facilitate the used of high dielectric polymer materials, such as PVDF, as electrode materials to increase actuator performance of the artificial muscles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    positioning a layer stack comprising an electrode positioned between an electrode insulator and a support polymer in a vacuum bag;
    removing air from the vacuum bag thereby vacuum coupling the electrode to the electrode insulator; and
    removing the layer stack from the vacuum bag, wherein upon removal of the layer stack from the vacuum bag, the electrode remains vacuum coupled to the electrode insulator, thereby forming an electrode assembly.

2. The method of claim 1, further comprising heat sealing the support polymer to the electrode while the layer stack is positioned in the vacuum bag such that, upon removal of the layer stack from the vacuum bag, the support polymer is coupled to the electrode.

3. The method of claim 2, wherein the support polymer comprises an overhang portion that, upon removal of the layer stack from the vacuum bag, the support polymer is coupled to the electrode insulator.

4. The method of claim 2, wherein:
    a first heat release layer is positioned between the electrode insulator and the vacuum bag;
    a second heat release layer is positioned between the support polymer and the vacuum bag; and
    the first and second heat release layers are removed from the layer stack after heat sealing the support polymer to the electrode.

5. The method of claim 1, wherein the electrode insulator comprises a high dielectric constant polymer.

6. The method of claim 5, wherein the high dielectric constant polymer comprises a halogenated polymer.

7. The method of claim 6, wherein the halogenated polymer comprises PVDF.

8. The method of claim 1, wherein:
    the electrode comprises two or more radially extending portions and two or more bridge portions; and
    each of the two or more bridge portions interconnects adjacent radially extending portions.

9. The method of claim 1, wherein the support polymer comprises biaxially oriented polypropylene (BOPP).

10. A method comprising:
    forming a first electrode assembly and a second electrode assembly, wherein forming each electrode assembly comprises:
        positioning a layer stack comprising an electrode positioned between an electrode insulator and a support polymer in a vacuum bag;
        removing air from the vacuum bag thereby vacuum coupling the electrode to the electrode insulator; and
        removing the layer stack from the vacuum bag, wherein upon removal of the layer stack from the vacuum bag, the electrode remains vacuum coupled to the electrode insulator, thereby forming the electrode assembly;
    positioning the first electrode assembly and the second electrode assembly in a stacked arrangement between a first film layer and a second film layer; and
    sealing the first film layer to the second film layer thereby forming an artificial muscle comprising the first electrode assembly and the second electrode assembly housed within a housing formed from the first film layer and the second film layer.

11. The method of claim 10, wherein:
    forming each electrode assembly further comprises heat sealing the support polymer to the electrode and the electrode insulator while the layer stack is positioned in the vacuum bag such that, upon removal of the layer stack from the vacuum bag, the support polymer is coupled to the electrode; and
    the support polymer comprises an overhang portion that, upon removal of the layer stack from the vacuum bag is coupled to the electrode insulator.

12. The method of claim 10, further comprising injecting a dielectric fluid into the artificial muscle between the first electrode assembly and the second electrode assembly.

13. The method of claim 10, wherein sealing the first film layer to the second film layer defines a sealed portion of the housing of the artificial muscle, the housing further comprising an unsealed portion surrounded by the sealed portion, wherein an electrode region and an expandable fluid region of the housing are disposed in the unsealed portion.

14. The method of claim 10, wherein:
    the electrode of each of the first electrode assembly and the second electrode assembly comprises two or more radially extending portions and two or more bridge portions; and
    each of the two or more bridge portions interconnects adjacent radially extending portions.

15. The method of claim 10, wherein sealing the first film layer to the second film layer comprises heat sealing the first film layer to the second film layer.

16. An artificial muscle comprising:
    a housing comprising an electrode region and an expandable fluid region;
    a fluid housed within the housing;
    an electrode pair positioned in the electrode region of the housing, the electrode pair comprising a first electrode and a second electrode; and
    an electrode insulator that is vacuum coupled to the first electrode, wherein:
        the first electrode insulator comprises a polymer; and
        the electrode pair is actuatable between a non-actuated state and an actuated state such that actuation from the non-actuated state to the actuated state directs the fluid into the expandable fluid region, expanding the expandable fluid region.

17. The artificial muscle of claim 16, wherein:

the electrode insulator comprises a first electrode insulator; and a second electrode insulator vacuum coupled to the second electrode and in direct contact with the second electrode, wherein the second electrode insulator comprises a polymer.

18. The artificial muscle of claim 16, wherein the polymer comprises a halogenated polymer.

19. The artificial muscle of claim 18, wherein the halogenated polymer comprises PVDF.

20. The artificial muscle of claim 16, wherein:

the first electrode and the second electrode each comprise two or more radially extending portions and two or more bridge portions;

each of the two or more bridge portions interconnects adjacent radially extending portions; and at least one of the first electrode and the second electrode comprises a central opening positioned between the two or more radially extending portions and encircling the expandable fluid region.

\* \* \* \* \*

UNITED STATES PATENT AND TRADEMARK OFFICE
CERTIFICATE OF CORRECTION

PATENT NO. : 11,602,839 B2
APPLICATION NO. : 17/573070
DATED : March 14, 2023
INVENTOR(S) : Michael Rowe and Ryohei Tsuruta It is certified that error appears in the above-identified patent and that said Letters Patent is hereby corrected as shown below:

On the Title Page

In page 2, Column 1, item (56), U.S. patent documents, cite no. 4, delete "Najaf et al." and insert --Najafi et al.--, therefor.

Signed and Sealed this
Twenty-fifth Day of April, 2023

Katherine Kelly Vidal
*Director of the United States Patent and Trademark Office*